(12) United States Patent
Buyukozturk et al.

(10) Patent No.: US 10,947,158 B2
(45) Date of Patent: Mar. 16, 2021

(54) POLYMER IRRADIATION IN CEMENT PASTE FORMATION

(71) Applicant: Massachusetts Institute of Technology, Cambridge, MA (US)

(72) Inventors: Oral Buyukozturk, Chestnut Hill, MA (US); Michael Philip Short, Cambridge, MA (US); Carolyn E. Schaefer, Cold Spring, NY (US); Michael Ortega, Los Angeles, CA (US); Anne E. White, Cambridge, MA (US); Kunal Kupwade-Patil, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 176 days.

(21) Appl. No.: 16/011,831

(22) Filed: Jun. 19, 2018

(65) Prior Publication Data
US 2019/0382309 A1    Dec. 19, 2019

(51) Int. Cl.
| | |
|---|---|
| *C04B 26/18* | (2006.01) |
| *C04B 7/02* | (2006.01) |
| *C04B 7/44* | (2006.01) |
| *C08L 67/02* | (2006.01) |
| *C04B 28/04* | (2006.01) |
| *C04B 24/28* | (2006.01) |
| *C08G 63/88* | (2006.01) |
| *C08G 63/183* | (2006.01) |
| *C04B 103/00* | (2006.01) |

(52) U.S. Cl.
CPC ............. *C04B 26/18* (2013.01); *C04B 7/02* (2013.01); *C04B 7/4453* (2013.01); *C04B 24/283* (2013.01); *C04B 28/04* (2013.01); *C08G 63/183* (2013.01); *C08G 63/88* (2013.01); *C08L 67/02* (2013.01); *C04B 2103/0062* (2013.01); *C04B 2235/3208* (2013.01); *C04B 2235/5232* (2013.01); *C08L 2312/00* (2013.01); *Y02W 30/91* (2015.05)

(58) Field of Classification Search
CPC ......... C04B 26/18; C04B 7/02; C04B 7/4453; C04B 28/04; C04B 24/283; C04B 2235/3208; C04B 2235/5232; C04B 2103/0062; C08G 63/88; C08G 63/183; C08L 67/02; C08L 2312/00; Y02W 30/91
See application file for complete search history.

(56) References Cited

U.S. PATENT DOCUMENTS

| | | | | |
|---|---|---|---|---|
| 2013/0319294 A1* | 12/2013 | Gehrig | ............. | C04B 28/02 106/694 |
| 2014/0187680 A1* | 7/2014 | Kripavicius | ............. | C04B 28/04 524/5 |

OTHER PUBLICATIONS

Cordoba et al., "Effects on Mechanical Properties of Recycled PET in Cement-Based Composites", Hindawi Publishing Corporation, International Journal of Polymer Science, vol. 2013, http://dx.doi.org/10.1155/2013/763276, 2013, pp. 1-7.*
Labib, Mohammed et al., "Recycled Plastic Fibers for Asphalt Mixtures", FHWA NJ Apr. 2000, New Jersey Department of Transportation, Division of Research and Technology, https://cait.rutgers.edu/files/FHWA-NJ-2000-004.pdf Aug. 1999 , 93 Pages.
Schaefer, Carolyn E. et al., "Irradiated recycled plastic as a concrete additive for improved chemo-mechanical properties and lower carbon footprint", Elsevier, Waste Management, vol. 71 6/19/17 , pp. 426-439.
Martinez-Barrera, Gonzalo et al., "Mechanical Improvement of Concrete by Irradiated Polypropylene Fibers", Polymer Engineering and Science—2005, DOI 10.1002/pen.20418 2005 , 6 Pages.
Martinez-Barrera, Gonzalo et al., "Gamma Radiation as a Recycling Tool for Waste Materials Used in Concrete", Evolution of Ionizing Radiation Research, http://dx.doi.org/10.5772/60435 Sep. 17, 2015 , 22 Pages.
Siddique, Rafat et al., "Use of recycled plastic in concrete: A review", Waste Management 28 (2008) 1835-1852 Sep. 5, 2007 , 18 Pages.
Ahmedzade, Perviz et al., "Effect of Gamma-Irradiated Recycled Low-Density Polyethylene on the High- and Low-Temperature Properties of Bitumen", International Journal of Polymer Science, vol. 2013, Article ID 141298, 2013. https://doi.org/10.1155/2013/141298. Jun. 3, 2013 , 6 Pages.
Martinez-Barrera, Gonzalo et al., "Concrete reinforced with irradiated nylon fibers", J. Mater. Res., vol. 21, No. 2, Feb. 2006 Jun. 3, 2005 , 8 Pages.
Gu, Lei et al., "Use of recycled plastics in concrete: A critical review", Waste Management 51 (2016) 19-42 Mar. 9, 2016 , 24 Pages.
Martinez-Barrera, Gonzalo et al., "Mechanical properties of polypropylene-fiber reinforced concrete after gamma irradiation", Composites: Part A 42 (2011) 567-572 Feb. 1, 2011 , 6 Pages.
Wang, W. et al., "Effects of Gamma-Irradiated Recycled Low-Density Polyethylene on the Creep and Recovery Properties of Asphalt", Journal of Highway and Transportation Research and Development vol. 12, No. 1 (2018)013 2018 , 6 Pages.
Ahmedzade, Perviz et al., "Modification of bitumen by electron beam irradiated recycled low density polyethylene", Construction and Building Materials 69 (2014) Aug. 5, 2014 , 9 Pages.

\* cited by examiner

*Primary Examiner* — Patrick D Niland
(74) *Attorney, Agent, or Firm* — Strategic Patents, P.C.

(57) ABSTRACT

Devices, systems, and methods of the present disclosure are generally directed to building material including particles of a polymer in an irradiated form, a cement including calcium oxide, and at least one additive including silicon dioxide. In cement paste formed from a mixture of these components, the polymer in the irradiated form may decrease porosity as compared to porosity of cement paste formed without the polymer, and a combination of the silicon dioxide and the calcium oxide may form high-density phases in the cement paste. With these characteristics, such cement paste may exhibit at least the same compressive strength as cement paste formed from the cement by itself. Thus, in certain instances, the particles of the polymer may displace a portion of the cement in a manner that maintains compressive strength while facilitating reduction of greenhouse gas emissions associated with cement paste formation.

18 Claims, 13 Drawing Sheets

POLYMER IRRADIATION IN CEMENT PASTE FORMATION

BACKGROUND

Production of building materials (e.g., cement paste) contributes heavily to greenhouse gas emissions. To lower the carbon footprint associated with production of build materials, cement used in the formation of such build materials may be partially replaced with another material. Such partial replacement of cement with substitute material can reduce direct emissions associated with the calcination that takes place during the formation of cement paste as well as indirect emissions associated with energy required to produce cement paste. The effectiveness of such a substitution, however, depends on the substitute material.

Constituting an environmental issue separate from production of building material is the abundance of plastic waste. For decades, recycling has been considered a useful solution for addressing plastic waste, with two common approaches to plastic recycling including: (1) standard mechanical recycling, which aims to recover plastic via mechanical processes and produces material that can be transformed into new plastic products; and (2) recycling in the form of repurposing the waste plastic without fully breaking it down. Mechanical recycling, however, can degrade the quality of the plastic and may be associated with additional pollution as the mechanically recycled plastic is transported for subsequent end-use. Accordingly, from an environmental perspective, repurposing waste plastic in other industries can be preferable to standard mechanical recycling.

In view of the environmental challenges associated with the formation of building materials and the abundance of waste plastic, the concept of using repurposed plastic as a partial replacement for cement in the formation of cement paste has promise in environmentally responsible construction techniques. However, the use of plastic as an aggregate in partial replacement of cement in cement paste can adversely impact compressive strength and, thus, the usefulness of the resulting cement paste. Thus, there remains a need for improving the compressive strength of plastic-enhanced cement paste to facilitate the proliferation of such enhanced material as a substitute for conventional cement paste across a variety of applications.

SUMMARY

Devices, systems, and methods of the present disclosure are generally directed to building material including particles of a polymer in an irradiated form, a cement including calcium oxide, and at least one additive including silicon dioxide. In cement paste formed from a mixture of these components, the polymer in the irradiated form may decrease porosity as compared to porosity of cement paste formed without the polymer, and a combination of the silicon dioxide and the calcium oxide may form high-density phases in the cement paste. With these characteristics, such cement paste may exhibit at least the same compressive strength as cement paste formed from the cement by itself. Thus, in certain instances, the particles of the polymer may displace a portion of the cement in a manner that maintains compressive strength while facilitating reduction of greenhouse gas emissions associated with cement paste formation.

In certain implementations, a method of forming a building material including receiving particles of a polymer, the polymer having a semi-crystalline structure, irradiating the particles of the polymer with a dose of gamma radiation increasing crystallinity and crosslinking of the polymer, and forming a mixture including the particles of the polymer, a cement, and at least one additive, the cement including calcium oxide, and the at least one additive including silicon dioxide.

In some implementations, the dose of gamma radiation may be greater than about 100 kGy and less than about 150 kGy. Additionally, or alternatively, irradiating the particles of the polymer may include introducing the dose of the gamma radiation to the particles of the polymer at a rate of 58 Gy/min.

In certain implementations, irradiating the particles of the polymer may increase crystallinity of the polymer by at least about 15 percent.

In some implementations, the at least one additive may further include alumina.

In certain implementations, the at least one additive may include silica fume, fly ash, or a combination thereof. Additionally, or alternatively, the cement may be ordinary Portland cement. Further, or instead, the polymer may be polyethylene terephthalate.

In some implementations, the particles of the polymer may be greater than about 1 percent of a total mass of the mixture in an anhydrous form and less than about 2 percent of the total mass of the mixture in the anhydrous form. Further, or instead, the at least one additive may be greater than about ten percent of a total mass of the mixture in the anhydrous form and less than about 20 percent of the total mass of the mixture in the anhydrous form. Additionally, or alternatively, the cement may be greater than about 80 percent of a total mass of the mixture in the anhydrous form and less than about 90 percent of the total mass of the mixture in the anhydrous form.

In certain implementations a mean particle size of the at least one additive may be greater than about 10 microns and less than about 50 microns. Additionally, or alternatively, a mean particle size of the cement may be greater than about 10 microns and less than about 20 microns.

In some implementations, receiving the particles of the polymer may include receiving a stock material and mechanically separating the particles of the polymer from other components in a stream of stock material. Additionally, or alternatively, receiving the particles of the polymer may include mechanically reducing an average particle size of the particles of the polymer. For example, the average particle size of the particles of the polymer may be reduced to a predetermined average particle size greater than about 100 microns and less than about 200 microns. Further, or instead, mechanically reducing the average particle size of the particles of the polymer may include ball milling the particles of the polymer.

In certain implementations, the method may further include hydrating the mixture to form a cement paste. For example, hydrating the mixture to form the cement paste may include adding water to the mixture in a predetermined volumetric ratio with the cement. Additionally, or alternatively, the method may further include maintaining substantially constant moisture content in the cement paste during a curing period following formation of the cement paste. Further, or instead, the method may further include exposing the cement paste to a polar solvent following a predetermined curing period.

According to another aspect, a building material may include a cement including calcium oxide, at least one additive including silicon dioxide, and particles of a polymer having a semi-crystalline structure, the polymer in an irradiated form having crystallinity and crosslinking greater than respective crystallinity and crosslinking of the polymer in a non-irradiated form, wherein the at least one additive and the particles of the polymer are dispersed in the cement in a mixture.

In certain implementations, the crystallinity of the irradiated form of the polymer may be at least about 15 percent greater than the crystallinity of the polymer in the non-irradiated form.

In some implementations, the cement may be ordinary Portland cement. Further, or instead, the at least one additive may further include alumina. Additionally, or alternatively, the at least one additive may include silica fume, fly ash, or a combination thereof. Still further or instead, the polymer may be a thermoplastic (e.g., a polyester, such as polyethylene terephthalate).

In certain implementations, the particles of the polymer may be greater than about 1 percent of a total mass of an anhydrous form of the mixture and less than about 2 percent of the total mass of the anhydrous form of the mixture.

In some implementations, the at least one additive may be greater than about ten percent of a total mass of an anhydrous form of a mixture and less than about 20 percent of the total mass of the anhydrous form of the mixture.

In certain implementations, the cement may be greater than about 80 percent of a total mass of an anhydrous form of a mixture and less than about 90 percent of the total mass of the anhydrous form of the mixture.

In some implementations, a mean particle size of the at least one additive may be greater than about 10 microns and less than about 50 microns. Additionally, or alternatively, a mean particle size of the cement may be greater than about 10 microns and less than about 20 microns. Further, or instead, the particles of the polymer may have an average particle size greater than about 100 microns and less than about 200 microns.

In certain implementations, the build material may further include corundum in a ratio with the particles of the polymer in a predetermined mass ratio of greater than about 8:1 and less than about 10:1.

In some implementations, the build material may further include water in the mixture of the cement, the at least one additive, and the particles of the polymer. For example, the water may be in a predetermined ratio relative to the cement. The predetermined ratio of water to cement may be about 0.35:1.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

Like reference symbols in the various drawings indicate like elements.

DETAILED DESCRIPTION

Figure 1A:
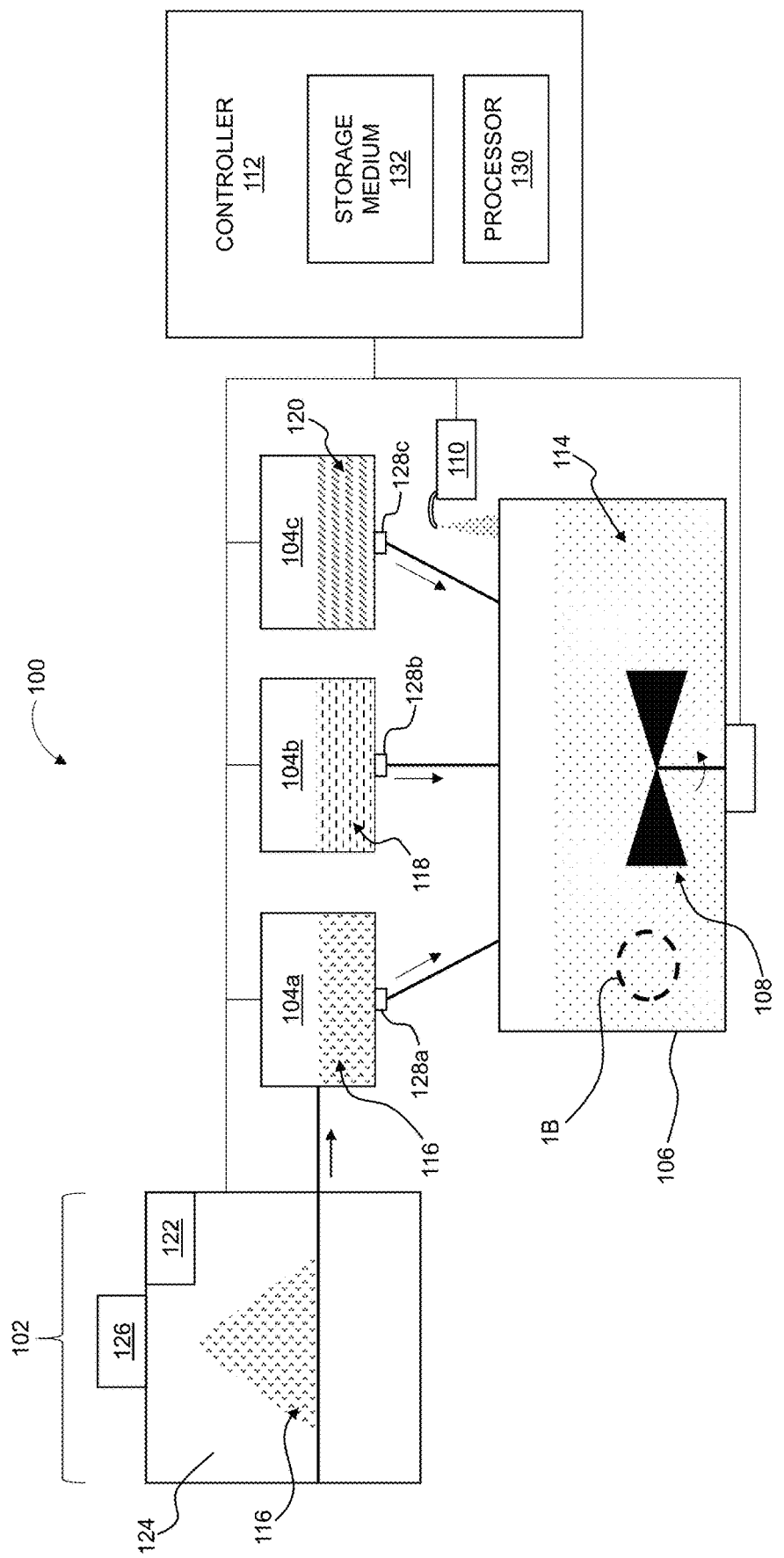
FIG. 1A is a schematic representation of a system for forming a building material.

The embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and, similarly, the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first" "second" "above," and "below" and the like, are words of convenience and are not to be construed as limiting terms.

In the description that follows, building materials are described as being formed through co-located equipment in an integrated facility as one or more steps carried out to process and/or combine materials. It should be appreciated, however, that this is for the sake of clarity of description and, more generally, any one or more aspects of the following description may be carried out in separate locations, as may be useful for efficient construction techniques. As an example, a build material may be mixed together at a central location and transported as necessary in an anhydrous form, which may be particularly useful for maintaining stability of the build material over long distances and periods of time. Continuing with this example, the anhydrous build material may be hydrated at or near a construction site to form cement paste a short time before the cement paste is poured or otherwise delivered into a form. Additionally, or alternatively, given the complexity and safety considerations associated with gamma irradiation, an irradiation facility may be located apart from (e.g., in a separate facility) other components of a system used to form the build materials of the present disclosure. Thus, continuing with this example, particles of a polymer may be irradiated at the irradiation facility and transported to another location, where the particles of the polymer in an irradiated form may be mixed with one or more other components of a build material.

Further, in the description that follows, the terms "non-irradiated" and "irradiated" are used distinguish relative changes in a polymer resulting from exposure to radiation. That is, in general, the non-irradiated form of a polymer should be understood to be the form of a given polymer prior to a dose of radiation, and the irradiated form of the polymer should be understood to be the form of the given polymer following the dose of radiation, provided that the dose of radiation is sufficient to change one or more characteristics of the polymer. As an example, the polymer may include a semi-crystalline structure, and an irradiated form of the polymer may have crystallinity and crosslinking greater than respective crystallinity and crosslinking of the polymer in a non-irradiated form.

Figure 1B:
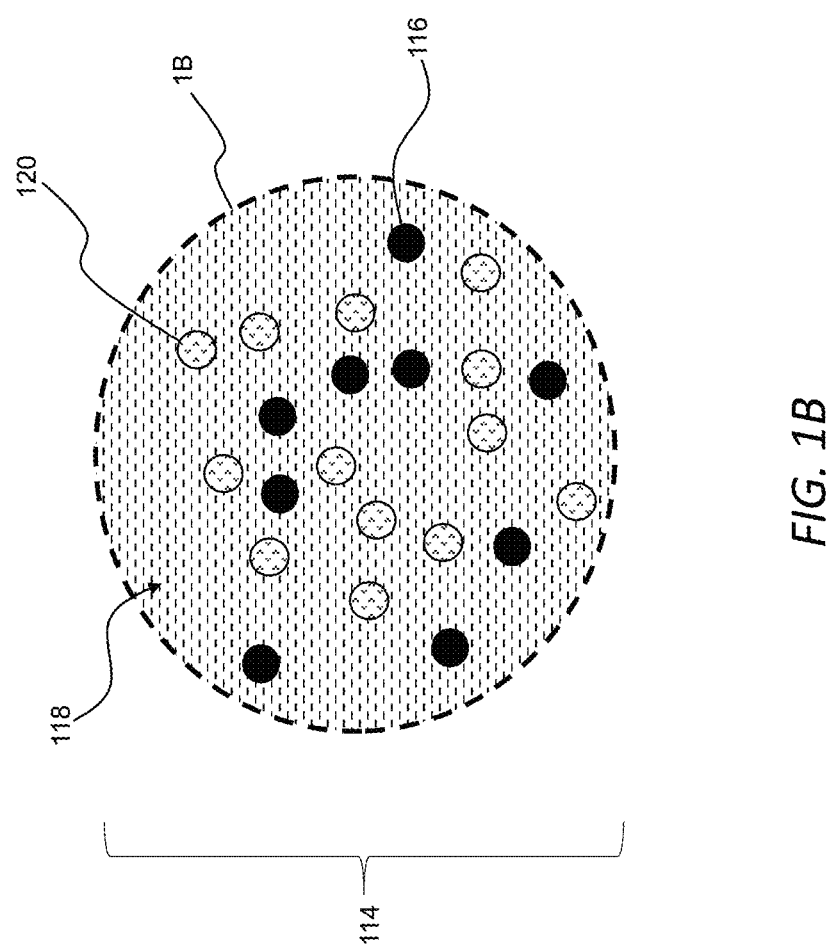
FIG. 1B is an enlarged view of a building material, shown along the area of detail 1B in FIG. 1A.

Referring now to FIGS. 1A and 1B, a system 100 may include a processing unit 102, material sources 104a, 104b, and 104c, a receptacle 106, a mixer 108, a hydration source 110, and a controller 112. In use, as described in greater detail below, the controller 112 may be in communication with one or more of the processing unit 102, the material sources 104a, 104b, and 104c, the mixer 108, and the hydration source 110 to form particles of a polymer 116 into an irradiated form and to mix the particles of the polymer 116 in the irradiated form with at least a cement 118 and at least one additive 120 to form a build material 114 in the receptacle 106. As also described in greater detail below, because the particles of the polymer 116 in the irradiated form may be derived from one or more sources (e.g., gamma irradiation of plastic, such as recycled plastic) associated with greenhouse gas emissions lower than those associated with the cement 118, replacing a portion of the cement 118 in a given volume with the particles of the polymer 116 in an irradiated form may result in the build material 114 being useful as an environmentally responsible substitute for traditional cement used in the formation of cement paste. In what amounts to a surprising and significant result, the experimental results described herein demonstrate that the build material 114 may be formed (e.g., through a hydration process) into a cement paste having at least the same compression strength as cement paste formed from the cement 118 alone. Thus, as compared to other types construction materials, the build material 114 may be useful as an environmentally responsible substitute for traditional cement without compromising compression strength.

Referring to FIG. 1B, the build material 114 may include the particles of the polymer 116 and the at least one additive 120 dispersed in the cement 118 in a mixture, which may be an anhydrous mixture (e.g., as may be useful for transport) or a hydrated mixture (e.g., a mixture including water in a predetermine ratio—for example, about 0.35:1 relative to the cement 118 or in another ratio useful for forming a slurry curable into cement paste). The particles of the polymer 116 may have a semi-crystalline structure, which is advantageously found in different types of commonly used polymers—and, more specifically, ubiquitous in polymers found in streams of waste materials—while also being amenable to beneficial alteration through exposure to radiation. For example, the semi-crystalline structure of the polymer 116 may be irradiated such that an irradiated form of the polymer 116 has crystallinity and crosslinking greater than respective crystallinity and crosslinking of the polymer 116 in a non-irradiated form. Without wishing to be bound by a particular mechanism of action, this increased crystallinity and crosslinking may advantageously decrease the porosity of cement paste formed from the polymer 116 in the irradiated form as compared to the porosity of cement paste formed from the polymer 116 in a non-irradiated form. Further, or instead, the cement may include calcium oxide (CaO), the at least one additive may include silicon dioxide ($SiO_2$), and, in combination, the calcium oxide and the silicon dioxide may interact with one another to facilitate formation of high-density phases in cement paste formed from the build material 114. This combination of components—namely, the polymer 116 in the irradiated form, the cement including calcium oxide, and the at least one additive including silicon dioxide—have properties that work in combination with one another in the formation of polymer-containing cement paste having desirable structural properties, as described in greater detail in the experimental results in the disclosure that follows.

The polymer 116 may be any of various different types of polymers having a semi-crystalline structure. In certain instances, the polymer 116 may have a composition suitable for primary use as a formed article useful in other applications in which the formed article is ubiquitous and reuse of a formed article of the polymer 116 is limited. That is, the polymer 116 may be used as a formed article that is abundant in commercial and/or residential waste streams such that the use of the polymer 116 in the build material 114 recycles the polymer 116. Thus, for example, the formed article of the polymer 116 may be any of various different types of bottles or containers used in the packaging of food and/or beverages and, further or instead, amenable to separation from a mixed waste stream through high-volume separation techniques used in plastic recycling. By way of example, the formed article of the polymer 116 may be marked with a Resin Identification Code defined in ASTM D7611/D7611M-13e1, "Standard Practice for Coding Plastic Manufactured Articles for Resin Identification, ASTM International, West Conshohocken, Pa. (2013), the entire contents of which are incorporated herein by reference. Such marking may be useful, for example, for reliably identifying a particular composition of the polymer 116 such that the particles of the polymer 116 used in the build material 114 have a substantially known composition.

In certain implementations, the physicochemical properties that make the polymer 116 suitable for use in a primary application, such as bottles or containers, may differ from those properties useful for using the polymer 116 as a partial replacement for the cement 118 in the build material 114 in a secondary application. Accordingly, the semi-crystalline structure of the polymer 116 may be alterable (e.g., in a controlled manner useful for achieving targeted changes in the polymer 116) to make the polymer 116 better suited for secondary use in the build material 114. To forming the build material 114 with a net carbon emissions benefit relative to conventional cement paste, however, carbon emissions associated with techniques used to alter the semi-crystalline structure of the polymer 116 must be taken into account. Thus, in certain implementations, the semi-crystalline structure of the polymer 116 may be advantageously alterable using one or more techniques associated with low carbon emissions. For example, the polymer 116 may have a semi-crystalline structure responsive to doses of radiation that can be safely and controllably delivered within periods (e.g., less than about 48 hours) suitable for commercial-scale production of the build material 114.

The polymer 116 may be, for example, a thermoplastic (e.g., a polyester such as polyethylene terephthalate (PET)). In addition to being in widespread use in primary applications serving as potential sources of particles of the polymer 116, thermoplasticity of the polymer 116 may facilitate handling the polymer 116 as part of one or more processes for recycling the polymer 116 from a primary application to use in the build material 114. As an example, thermoplasticity of the polymer 116 may facilitate separating the polymer 116 from other types of material in a waste stream. Additionally, or alternatively, thermoplasticity of the polymer 116 may be useful for controlling physical characteristics (e.g., size, shape, or a combination thereof) of particles of the polymer 116 for use in the build material 114.

The particles of the polymer 116 may be sized and shaped according to any of various different considerations associated with formation of the build material 114. As a more specific example, the particles of the polymer 116 may have an average particle size greater than about 100 microns and less than about 200 microns, which is a size range that advantageously balances competing considerations of ease of handling prior to introduction into the build material 114 and effective distribution within the cement 118 during formation of the build material 114. Continuing with this example, the average particle size in this range may facilitate effective irradiation of the polymer 116 into an irradiated form having increased crystallinity and crosslinking relative to a non-irradiated form of the polymer 116.

The at least one additive 120 may include any one or more of various different types of different additives including silicon dioxide and useful in enhancing strength of cement paste. In general, the at least one additive 120 may have a chemical composition different from the cement 118 and the polymer 116. As described in greater detail below, the increased silicon dioxide achieved through the use of the at least one additive 120 as a component of the build material 114 may advantageously increase high density phases in the cement paste formed from the build material 114. In certain implementations, the at least one additive 120 may additionally or alternatively include alumina ($Al_2O_3$), which may also advantageously increase high density phases in the cement paste formed from the build material 114.

The at least one additive 120 may include one or more industrial byproducts, which may be useful for mitigating the potentially hazardous environmental impacts of such byproducts. The at least one additive 120 may be formed, in certain instances, from industrial byproducts that are in an abundant supply and, therefore, cost-effective for use in large volumes associated with the formation of cement paste on a large scale. As an example, the at least one additive 120 may include silica fume, a byproduct of silicon production. Additionally, or alternatively, the at least one additive 120 may include fly ash, a byproduct of coal combustion.

The at least one additive 120 may be, in general, any of various different sizes compatible with the respective sizes of other components forming the build material 114. In this context, such compatibility may include a size distribution that is substantially consistent and, further or instead, amenable to substantially uniform distribution in the cement 118 during formation of the build material 114. Thus, for example, the at least one additive 120 may have a mean particle size of greater than about 10 microns and less than about 50 microns.

In general, the cement 118 may be any of various different types of cement known for use in the formation of cement paste. As an example, the cement 118 may be formed from naturally-occurring materials (e.g., limestone, shale, or a combination thereof) that are widely available and may be cost-effectively sourced. Accordingly, as a more specific example, the cement 118 may include any of various different forms of Portland cement, which may include Portland cement. As used herein, "Portland cement" may include a hydraulic material having a composition (by mass) primarily including calcium silicates. Further or instead, Portland cement may include any one or more cements as defined in ASTM C150/C150M-18, entitled "Standard Specification for Portland Cement," ASTM International, West Conshohocken, Pa. (2018), the entire contents of which are hereby incorporated herein by reference. As a specific example, ordinary Portland cement shall be understood to include any cement meeting the requirements of Type I Portland cement, as specified in ASTM C150/C150M-18.

The cement 118 may have any of various different sizes useful in various different construction applications. For example, the cement 118 may have a mean particle size greater than about 10 microns and less than about 20 microns. This size range may be useful for facilitating handling the cement 118 using typical cement handling techniques and equipment and, further or instead, may be useful for facilitating mixing the cement 118 with other components of the build material 114 to achieve a substantially homogeneous mixture without the need for specialized equipment.

In general, the build material 114 may have a composition suitable for balancing competing design considerations associated with achieving suitable compression strength while also using enough of the polymer 116 to achieve a useful environmental benefit. Thus, for example, the polymer 116 may be greater than about 1 percent of the total mass of the mixture in an anhydrous form and less than about 2 percent of the total mass of the mixture in an anhydrous form. Additionally, or alternatively, the cement 118 may be greater than about 80 percent of the total mass of the mixture in an anhydrous form and less than about 90 percent of the total mass of the mixture in an anhydrous form. In general, such a high percentage of the cement 118 in the mixture in the anhydrous form may facilitate forming cement paste having mechanical properties similar to those of cement paste formed from the cement 118 by itself. Still further or instead, the at least one additive may be greater than about 10 percent of the total mass of the mixture in an anhydrous form and less than about 20 percent by mass of the mixture in an anhydrous form. The percentage of the at least one additive in the mixture may be bounded, for example, by considerations associated with increasing strength of cement paste formed from the build material 114 in view of emissions considerations, cost, or a combination thereof, associated with the at least one additive itself.

Referring again to FIG. 1A, unless otherwise specified or made clear from the context, the build material 114 may be formed according to any one or more of the compositions described herein through operation of the system 100. In some implementations, the system 100 may have substantially fixed operating parameters useful for forming a predetermined composition of the build material 114, with such substantially fixed operating parameters being useful in large-scale manufacturing. In certain implementations, however, the system 100 may have one or more adjustable operating parameters useful for modifying composition of the build material 114, such as may be useful for varying formulation of the build material 114 to accommodate specific criteria.

In general, the processing unit 102 may include a radiation source 122 positioned to direct a controlled dose of radiation to the particles of the polymer 116 in a volume 124 defined by the processing unit 102. The radiation source 122 may be, for example, a cobalt-60 irradiator facility, which has the advantage of being in common commercial use in other applications (e.g., food irradiation). That is, a cobalt-60 irradiator facility may be particularly useful as well-understood radiation source that may be operated safely to handle a large throughput of material. As a more specific example, a cobalt-60 irradiator facility may deliver radiation at a rate (e.g., 58 Gy/min) suitable for radiating the particles of the polymer 116 within a timeframe (e.g. less than about 48 hours) compatible with high-volume production on a commercial scale.

In certain implementations, the processing unit 102 may include a grinder 124 in communication (e.g., through a gravity feed, a conveyor, or a combination thereof) with the volume 124 such that material processed in the grinder 124 is movable into the volume 124 for irradiation. The grinder 124 may receive a raw form (e.g., flakes) of the particles of the polymer 116 in a non-irradiated form and, further or instead, may mechanically reduce the size of the raw form of the particles of the polymer 116. For example, the grinder 124 may process the raw form of the particles of the polymer 116 to achieve a size distribution having an average particle size greater than about 100 microns and less than about 200 microns. The grinder 124 may include, for example, a ball mill. As a more specific example, the grinder 124 may include a high energy ball mill. Additionally, or alternatively, the grinder 124 may include other hardware suitable for crushing the particles of the polymer 116. While the grinder 124 has been described as grinding the particles of the polymer 116 prior to irradiation, it should be appreciated that the grinder 124 may additionally or alternatively be positioned to grind the particles of the polymer 116 following irradiation.

The volume 124 defined by the processing unit 102 may be in communication with one or more of the material sources 104a, 104b, 104c such that, following irradiation, the particles of the polymer 116 in an irradiated form may be movable into the respective one or more of the material sources 104a, 104b, 104c. Movement of the particles of the polymer 116 in the irradiated form from the volume 124 and into the one or more material sources 104a, 104b, 104c may be carried out according to any of various different techniques suitable for safely and efficiently moving the particles of the polymer 116. By way of example and not limitation, therefore, the particles of the polymer 116 in the irradiated form may be moved from the volume 124 and into one or more of the material sources 104a, 104b, 104c through movement of a conveyor extending from the volume 124 to the one or more material sources 104a, 104b, 104c.

In certain implementations, the material sources 104a, 104b, 104c may each store an individual component of the build material 114 prior to forming the build material 114 in the receptacle 106. Thus, for example, the particles of the polymer 116 in the irradiated form may be stored in the material source 104a. Additionally, or alternatively, the cement 118 may be stored in the material source 104b. Further, or instead, the at least one additive 120 may be stored in the material source 104c. While such segregation of components in the respective material sources 104a, 104b, 104c may be useful for controlling the compositional accuracy of the build material 114, it should be appreciated that other storage techniques are within the scope of the present disclosure. Thus, for example, multiple components of the build material 114 may be stored in a single one of the material sources 104a, 104b, 104c at the same time, as may be useful for premixing certain combinations of components (e.g., premixing the cement 118 and the at least one additive 120).

The material sources 104a, 104b, 104c may be any of various different types of containers suitable for stably storing the components of the build material 114. As used in this context, stable storage of material may include reducing the likelihood of unintended aggregation, settling, and/or hydration of each respective component. For example, the material sources 104a, 104b, 104c may be hoppers supported above the receptacle 106. Continuing with this example, the material sources 104a, 104b, 104c may each include respective valves 128a, 128b, 128c. Each of the valves 128a, 128b, 128c may be selectively actuatable to control delivery of the respective contents of the respective one of the material sources 104a, 104b, 104c. Further, or instead, the each of the valves 128a, 128b, 128c may include a metered orifice to facilitate accurately metering the flow of material from the respective one of the material sources 104a, 104b, 104c into the receptacle 106.

In general, the receptacle 106 may be of a size and shape suitable for supporting mixing of the contents of the build material 114 in quantities required for a particular manufacturing process. Further, or instead, the receptacle 106 may be formed of a material (e.g., steel) suitable for withstanding corrosion or other forms of degradation that may be associated with the build material 114.

The mixer 108 may be disposed in the receptacle 106 to facilitate mixing the constituent components of the build material 114 into a homogenous mixture. As used herein, a homogenous mixture shall be understood to include small variations in homogeneity such that the volumetric composition of the build material 114 varies by less than about ±5 percent (e.g., less than about ±1 percent) within the receptacle 106. The mixer 108 may be any one or more of various different types of mechanisms useful for combining the constituent components of the build material 114. Thus, for example, the mixer 108 may include a rotor or other similar component substantially submersible in the build material 114 and movable relative to the receptacle 106 to mix the components of the build material 114. Additionally, or alternatively, the receptacle 106 itself may move (e.g. through rotation, vibration, or a combination thereof) to mix the components of the build material 114. Thus, it should be more generally understood that the constituent components of the build material 114 may be formed into a homogeneous mixture through any one or more of various different forms of mechanical agitation. Further, or instead, in instances in which a sufficient amount of hydration is introduced into the build material 114 in the receptacle 106, the constituent components of the build material 114 may further or instead be mixed through the flow of water in the receptacle 106.

In general, the hydration source 110 may control moisture content of the build material 114 in the receptacle 106. In certain instances, the hydration source 110 may provide a small amount of water relative to the volume of the build material 114 in the receptacle 106 such that the build material 114 remains anhydrous but the small amount of water is useful for reducing the formation of fine particulates as the build material 114 is mixed. As used herein, an anhydrous form of the build material 114 shall be understood include a composition of the build material 114 having a low moisture content such that the build material 114 flows like a powder. Additionally, or alternatively, an anhydrous form of the build material 114 should be understood to have a moisture content less than about ±2 percent by mass (e.g., less than about ±1 percent by mass).

In certain implementations, the hydration source 110 may introduce larger quantities of water into the receptacle 106 to form a hydrated form of the build material 114. As used in this context, a hydrated form of the build material 114 shall be understood to be any form of the build material 114 that is not anhydrous. Thus, for example, a hydrated form of the build material 114 may include sufficient water content such that the build material 114 does not flow like a powder. As a more specific example, a hydrated form of the build material 114 shall be understood to include sufficient water content such that the build material 114 flows like a slurry. More specifically still, a hydrated form of the build material 114 shall be understood to include sufficient water content such that the build material 114 may cure without the addition of other material.

In general, the controller 112 may include one or more processors 130 and a non-transitory, computer-readable medium 132 having stored thereon computer executable instructions for causing the one or more processors 132 to communicate with one or more other components of the system according one or more aspects of any one or more of the methods described in greater detail below. While the controller 112 may be single controller, it should be appreciated that the controller 112 may be implemented as a plurality of distributed controllers (e.g., operable individually), such as may be useful for controlling individual aspects of the system 100, particularly in instances in which the system 100 is itself distributed across multiple locations. Such distributed controllers may be, for example, in communication with one another (e.g., through a data network).

In certain implementations, the controller 112 may be in electrical communication with the valves 128a, 128b, 128c to control dispensing of the particles of the polymer 116, the cement 118, and the at least one additive 120 into the receptacle 106 in controlled proportions relative to one another. Additionally, or alternatively, the controller 112 may be in electrical communication with the mixer 108 to control movement (e.g., a rotational speed, a rotational direction, or a combination thereof) of the mixer 108. Further, or instead, the controller 112 may be in electrical communication with the hydration source 110 to control a rate or a total amount of water flow into the receptacle 106 such that a target amount of moisture may be introduced into the build material 114 as desired for a particular application. Still further or instead, the controller 112 may be in electrical communication with the processing unit 102 to control one or more different aspects of preparation of the particles of the polymer 116. For example, the controller 112 may control actuation of the grinder 126 to form the particles of the polymer 116 into a target size distribution. As an additional or alternative example, the controller 112 may control movement of the particles of the polymer 116 into and out of the volume 124 defined by the processing unit 102 to control the amount of radiation delivered to form the particles of the polymer 116 into the irradiated form.

Figure 2:
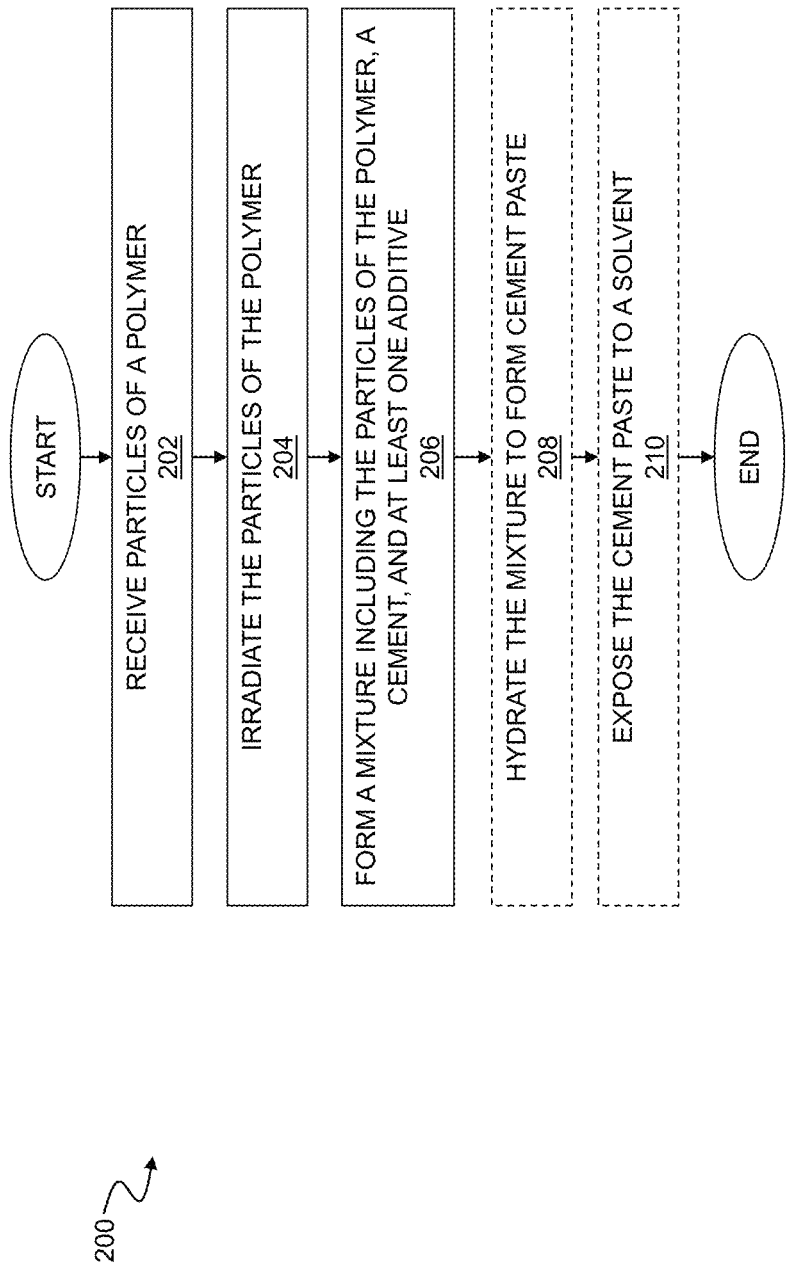
FIG. 2 is a flow chart of an exemplary method of forming a building material.

FIG. 2 is a flow chart of an exemplary method 200 of forming a building material. In general, the exemplary method 200 may be carried out using any manner and form of hardware described herein to form any one or more of the building materials described herein. Accordingly, unless otherwise specified or made clear from the context, the exemplary method 200 may be carried out using the system 100 (FIG. 1) to form the building material 114 (FIG. 1). Unless otherwise specified or made clear from the context, it should be generally appreciated that aspects of the exemplary method 200 may be carried out through manual processes (e.g., as carried out by one or more operators), automated processes (e.g., as carried out by the controller 112 of the system 100 in FIG. 1), or a combination thereof.

As shown in step 202, the exemplary method 200 may include receiving particles of a polymer. In general, the polymer may be any one or more of the polymers described herein. Accordingly, the polymer may have a semi-crystalline structure. As an example, the polymer may be a polyester such as polyethylene terephthalate (PET).

In some implementations, receiving the particles of the polymer may include receiving a stock material (e.g., a stream of mixed material waste, such as may be associated with a single-stream recycling process). As should be generally understood, such a stream of stock material may be substantially non-uniform. Accordingly, receiving the particles of the polymer may further or instead include mechanically separating the polymer (in particle form or in another form) from other components in the stream of stock materials. Such separation techniques may include any of various different separation techniques used in plastic recycling and, thus, may include manual sorting, optical sorting, or a combination thereof.

In certain implementations, receiving the particles of the polymer may include reducing an average particle size of the particles of the polymer. Particularly, in implementations in which the particles of the polymer are sourced from a waste stream or other similarly non-uniform source, reducing the average particle size of the particles may improve uniformity of the size of the particles of the polymer. In turn, improved uniformity of the size of the particles of the polymer may facilitate accurately metering the particles to achieve a target composition. Further, or instead, reducing the average particle size of the particles may facilitate handling the particles of the polymer.

The particles of the polymer may be reduced to a predetermined average particle size suitable, for example, for end-use in a build material formable into cement paste. In certain instances, the predetermined average particle size may serve as a useful proxy of a surface area-to-volume ratio useful for achieving desired interactions between the particles of the polymer and other components as the build material is formed into cement paste. In certain implementations, the average particle size of the particles of the polymer may be reduced to a predetermined average particle size greater than about 100 microns and less than about 200 microns. More generally, the average particle size of the particles of the polymer may be reduced to be about an order of magnitude larger than an average particle size of cement in which the particles of the polymer may be dispersed, as described in greater detail below.

Reducing the average particle size of the particles may include the use of any one or more of various different techniques useful for mechanically reducing the size of material. As used in this context, mechanically reducing the size of material should be understood to include producing reducing the size of the material without changing a chemical composition or state of matter of the particles of the polymer. As compared to certain thermochemical processes, mechanically reducing the size of the particles of the polymer may be more energy efficient and, further or instead, may reduce the need to store, handle, and dispose of additional materials that may be associated with such thermochemical processes. Grinding may be a particularly efficient and robust technique for reducing the average particle size. A particularly useful form of grinding may include ball milling (e.g., high energy ball milling).

As shown in step 204, the exemplary method 200 may include irradiating the particles of the polymer with a dose of gamma radiation sufficient to increase crystallinity and crosslinking of the polymer. As an example, the dose of gamma radiation may correspond to a dose sufficient to increase crystallinity of the polymer by greater than about 10 percent (e.g., greater than about 15 percent). Such a change in crystallinity may be useful, for example, for producing observable changes in one or more properties of the polymer, with such changes including one or more of increases in modulus, toughness, stiffness, and hardness.

In general, the dose of gamma radiation may be a function of any one or more of various different factors, such as the composition of the polymer and the targeted compression strength of cement paste formed from a build material including the particles of the polymer in the irradiated state. Thus, for certain applications, the dose of gamma radiation may be relatively low (e.g., greater than about 5 kGy and less than about 20 kGy). A relatively low dose of radiation may be useful for irradiating the particles of the polymer relatively quickly (on the order of a few hours). In certain implementations, however, the dose of gamma radiation may be relatively high, which requires longer processing time but may be useful for achieving comparably higher compression strength in cement paste, as discussed in the experimental results presented below. In this context, a relatively high dose of radiation should be understood to be greater than about 100 kGy and less than about 150 kGy and, for the avoidance of doubt, should be understood to be inclusive of 100 kGy. In general, the upper limit of 150 kGy may represent a point beyond which additional radiation of polymers with a semi-crystalline structure does not improve significant improvements in compression strength of cement paste. In certain implementations, the dose of gamma radiation may be a trade-off between speed and efficacy and, thus, for example, a dose of gamma radiation greater than about 20 kGy and less than about 100 kGy (e.g., about 50 kGy) may be useful.

The dosage of radiation delivered to the particles of the polymer may be delivered at a rate useful for safe operation in an industrial setting. Additionally, or alternatively, the dosage of radiation delivered to the particles of the polymer may be delivered at a rate sufficient to support high-volume throughput associated with commercial manufacturing. To accommodate these considerations, the dose of gamma radiation to the particles may be delivered, for example, by a cobalt-60 irradiator facility producing 58 Gy/min.

As shown in step 206, the exemplary method 200 may include forming a mixture including the particles of the polymer, a cement, and at least one additive. The mixture may be any one or more of the mixtures described herein and, thus, may be sufficiently homogeneous to produce cement paste having variations of material properties on the order of such variations typically observed in cement paste formed only from cement. Further, or instead, unless otherwise specified or made clear from the context, the mixture may be anhydrous or hydrated, depending on the application.

The cement may be any one or more of the cements described herein and, thus, in general may include calcium oxide. As specific example, the cement may be any one or more of various different types of cement defined by a standard setting organization. Thus, for example, the cement may be ordinary (Type I) Portland cement or any other type of Portland cement, as defined in ASTM C150/C150M-18. As an additional, or alternative example, the cement may have any one or more of the physical characteristics of cement described herein and, therefore, may have a mean particle size greater than about 10 microns and less than about 20 microns.

The at least one additive may be any one or more of the various different additives described herein and, therefore, may include silicon dioxide. More specifically, through the addition of the at least one additive, the mixture may have a higher mass fraction silicon dioxide than a mass fraction of silicon dioxide in the cement alone. Additionally, or alternatively, the at least one additive may include alumina. Continuing with this example, through the addition of the at least one additive, the mixture may have a higher mass fraction of alumina than a mass fraction of alumina in the cement alone. More generally, the at least one additive may include silica fume, fly ash, or a combination thereof. Further, or instead, a mean particle size of the at least one additive may be greater than about 10 microns and less than about 50 microns and, in some instances, may be substantially the same (e.g., within ±20 percent) as the mean particle size of the cement.

In general, the composition of the mixture may be any of various different compositions described herein. Thus, for example, the particles of the polymer may be greater than about 1 percent of the mass and less than about 2 percent of the mass of the mixture in an anhydrous form. Further, or instead, the at least one additive may be greater than about 10 percent by mass and less than about 20 percent by mass of the mixture in an anhydrous form. Still further or instead, the cement may be greater than about 80 percent of the mass and less than about 90 percent of the mass of the mixture in an anhydrous form. Given that the cement may be the predominant component of the anhydrous form of the mixture, it should be appreciated the polymer and the at least one additive may be dispersed in the cement as the mixture is formed.

As shown in step 208, the exemplary method 200 may include hydrating the mixture to form a cement paste (e.g., adding water to the mixture in a predetermined volumetric ratio with the cement). Such hydration may be carried out substantially contemporaneously with the formation of the mixture in step 206 in certain implementations, such as where the formation of the mixture is carried out near an end-use location for the cement paste to be formed from the cement. In some implementations, however, the mixture formed in step 206 may be an anhydrous mixture that may be advantageously transported and stored, such as may be useful for many residential or smaller construction projects. Continuing with this example, hydration may be carried out separately from the formation of the mixture in step 206. More generally, hydration may be carried out in temporal proximity with the intended end use of the cement paste.

In certain implementations, hydrating the cement may include maintaining substantially constant moisture content in the cement paste during a curing period following formation of the cement paste. The curing period may be, for example, a predetermined curing period, such as any one or more of various different curing periods (e.g., 7 days, 10 days, 14 days, 28 days) specified in various different standards. As an example, the curing period may be as defined in ASTM C150/C150M-18. Additionally, or alternatively, the curing period may correspond to a time required for the cement paste to attain a predetermined percentage (e.g., 70 percent) of the specified compressive strength.

As shown in step 210, the exemplary method 200 may include exposing the cement paste to a solvent following the curing period (e.g., a predetermined curing period). The solvent may be, for example, a polar solvent such as acetone to retard the hydration process of the cement paste. This may be desirable, for example, for forming test samples of the cement paste to verify various different characteristics of the cement paste, such as through one or more of the experiments described in the following disclosure. More generally, exposing the cement paste to a solvent to retard the hydration process may be useful for assuring consistent quality, which may be particularly useful in instances in which the particles of the polymer are sourced from recycled material and, therefore, may be prone to variation.

Experiments

The following experiments describe one or more aspects of the build materials described herein. It is to be understood, however, that these experiments and corresponding results are set forth by way of example only, with the intention of describing certain aspects of the build material 114 (FIGS. 1A and 1B) and/or the exemplary method 200 (FIG. 2). Nothing in these examples shall be construed as a limitation on the overall scope of the disclosure. Thus, for example, while these experiments are described with respect to build materials including polyethylene terephthalate (PET), this should not be understood to limit the techniques described herein.

1. Materials and Methods

A series of cement past samples were prepared, each with a different combination of mineral additive and plastic irradiation dose. Cement past samples were prepared using a water to cement ratio of 0.35 using Type I Portland cement, and Class F fly ash and silica fume were included as supplementary cementitious materials (SCM) in some instances. After a 28-day cure period, these specimens underwent compression testing to determine the variation in their strengths according to ASTM C109, "Standard Test Method for Compressive Strength of Hydraulic Cement Mortars (Using 2-in. Cube Specimens)," ASTM International, West Conshohocken, Pa. 2016, the entire contents of which are hereby incorporated herein by reference. To assess the internal structure of the cement past microstructure and, thus, gain some insight into aspects of compositions contributing to observed strength differences, a microstructural analysis was performed. The microstructural analysis included XRD, Backscattered Electron Spectroscopy/Energy Dispersive Spectrum (BSE/EDS), and X-ray micro tomography.

1.1 Mix Design for Cement Paste

The complete mix design for the cement paste samples is shown Table 1. Included are three different cement binders: Type I Ordinary Portland Cement (OPC), OPC with Class F fly ash (OPC+FA), and OPC with silica fume (OPC+SF). For each binder, there were low-dose, high-dose, and no-dose combinations. Each individual combination was triplicated so that an average compressive strength with an uncertainty could ultimately be determined. For each of the non-control samples, the plastic made up 1.25% of the dry mass, which was a value chosen based on the belief that the addition of plastic up to this percentage increases strength performance while concentrations above this value do not improve strength. For samples containing both the plastic additive and one of the mineral additives as the binder, the plastic only displaced the cement dry mass; the mineral additive made up 15% of the total dry mass.

TABLE 1

Mix design of the cement paste samples

| Notation | Binder | Type | Total dry mass (g) | Plastic (g) | OPC (g) | Class F fly ash (g) | Silica fume (g) |
|---|---|---|---|---|---|---|---|
| OPC-Ctrl | OPC | Ctrl | 1400 | 0 | 1400 | 0 | 0 |
| OPC-RP | OPC | RP | 1400 | 17.5 | 1382.5 | 0 | 0 |
| OPC-HD | OPC | HD | 1400 | 17.5 | 1382.5 | 0 | 0 |
| OPC-LD | OPC | LD | 1400 | 17.5 | 1382.5 | 0 | 0 |
| FA-Ctrl | OPC + FA | Ctrl | 1400 | 0 | 1190 | 210 | 0 |
| FA-RP | OPC + FA | RP | 1400 | 17.5 | 1172.5 | 210 | 0 |
| FA-HD | OPC + FA | HD | 1400 | 17.5 | 1172.5 | 210 | 0 |
| FA-LD | OPC + FA | LD | 1400 | 17.5 | 1172.5 | 210 | 0 |
| SF-Ctrl | OPC + SF | Ctrl | 1400 | 0 | 1190 | 0 | 210 |
| SF-RP | OPC + SF | RP | 1400 | 17.5 | 1172.5 | 0 | 210 |
| SF-HD | OPC + SF | HD | 1400 | 17.5 | 1172.5 | 0 | 210 |
| SF-LD | OPC + SF | LD | 1400 | 17.5 | 1172.5 | 0 | 210 |

FA = Fly ash,
SF = Silica fume,
Ctrl = No plastic,
RP = Regular plastic,
HD = High dose plastic,
LD = low dose plastic,
Water to Binder Ratio = 0.35

1.2 X-Ray Florescence (XRF) Spectroscopy and Particle Size Distribution (PSD) Analysis The chemical compositions of OPC, Class F fly ash, and silica fume were measured using X-Ray Florescence (XRF) spectroscopy. The results are shown in Table 2. The sum of silicon dioxide ($SiO_2$), aluminum oxide ($Al_2O_3$), and ferric oxide ($Fe_2O_3$) components for the fly ash was 90.01%, indicating that this material was a Class F type of ash according to ASTM C 618, "Standard Specification for Coal Fly Ash and Raw or Calcined Natural Pozzolan for Use in Concrete," ASTM International, West Conshohocken, Pa. 2003, the entire contents of which are hereby incorporated herein by reference. Particle size distribution (PSD) was conducted on all three materials by suspending them in isopropyl alcohol using a Laser Light Scattering technique with a particle size analyzer. The mean particle sizes for OPC, Class F fly ash, and silica fume were found to be 12.73 microns, 38.50 microns, and 12.05 microns, respectively.

TABLE 2

Mass % of oxide composition of the Portland cement, Class F fly ash, and silica fume.

| | Chemical Composition (mass % of oxide) | Binder Type | | |
|---|---|---|---|---|
| | | Ordinary Portland Cement | Class F Fly Ash | Silica Fume |
| Chemical Composition (mass % of oxide) | CaO | 62.27 | 3.82 | 1.2 |
| | $SiO_2$ | 16.63 | 61.72 | 85.50 |
| | $Al_2O_3$ | 3.63 | 19.07 | 1.61 |
| | MgO | 1.22 | 1.57 | 1.4 |
| | $SO_3$ | 3.91 | 0.25 | 0.4 |
| | $TiO_2$ | 0.24 | 2.44 | <0.05 |
| | $K_2O$ | 0.61 | 1.27 | 0.65 |
| | $Fe_2O_3$ | 3.28 | 9.22 | 1.89 |
| | $Na_2O$ | 0.34 | 0.68 | 0.43 |
| | MnO | 0.06 | — | 0.01 |
| | SrO | 0.07 | — | 0.01 |
| Mean Particle Size (microns) | | 12.73 | 38.50 | 12.05 |

1.3 Preparation of Irradiated Plastic Additive

In general, the strength properties of plastic vary according to dosage of radiation. Without wishing to be bound by theory, it is believed that different types of strength are maximized in different dose ranges. Accordingly, a high dose of 100 kGy and a low dose of 10 kGy were tested and compared. These levels determine the length of irradiation time for high- and low-dose plastic additives.

Plastic flakes obtained from a recycling facility were used for the plastic additive. Due to imperfections in sorting processes used by recycling facilities, the sample originally contained pieces of metal and other non-plastic impurities. To reduce the likelihood that these impurities would contaminate or ruin the test samples to be formed using these plastic flakes, the plastic was manually sorted to remove all materials that were clearly not plastic. Half of the plastic was then irradiated in a cobalt-60 irradiator facility that operates at 58 Gy/min. The low dose sample was left in the machine for 2.9 h for a total of 10 kGy. The high dose sample was left in the machine for 28.7 h for a total dose of 100 kGy. The flakes were then further crushed using both a high-energy ball mill and a mortar and pestle. The average particle size of 170 microns was measured using an optical microscope. In general, unless otherwise specified or made clear from the context, the plastic used in the experiments described herein should be understood to be a mixture of particles of a polymer (e.g., the polymer 116 in FIG. 1A) and corundum powder mixed in a ratio of 9:1.

The effect of the irradiation process on the PET's amorphous content was determined by calculating the amorphous and crystalline contributions for each of the three plastic types: high dose, low dose, and no dose. Powder X-ray diffraction (XRD) is useful for determining the relative amorphous content of most materials and was performed on all three plastics. The XRD pre-set specifications and experimental setup is described below in section 1.5.2 in the context of cement samples and should be understood to be the same for the XRD analysis of the plastics. To quantify the amorphous contribution, High Score Plus software (Malvern Panalytical of Westborough, Mass., United States) was used to analyze the diffraction patterns. The quantification technique used is based on the technique described in Klug, H. P., Alexander, L. E., *X-Ray Diffraction Procedures: For Polycrystalline and Amorphous Materials*, (Wiley, 1974). Though this quantification method does not necessarily produce absolute results, it allows for a batch-to-batch comparison for observing trends in the amorphous content.

Figure 3A:
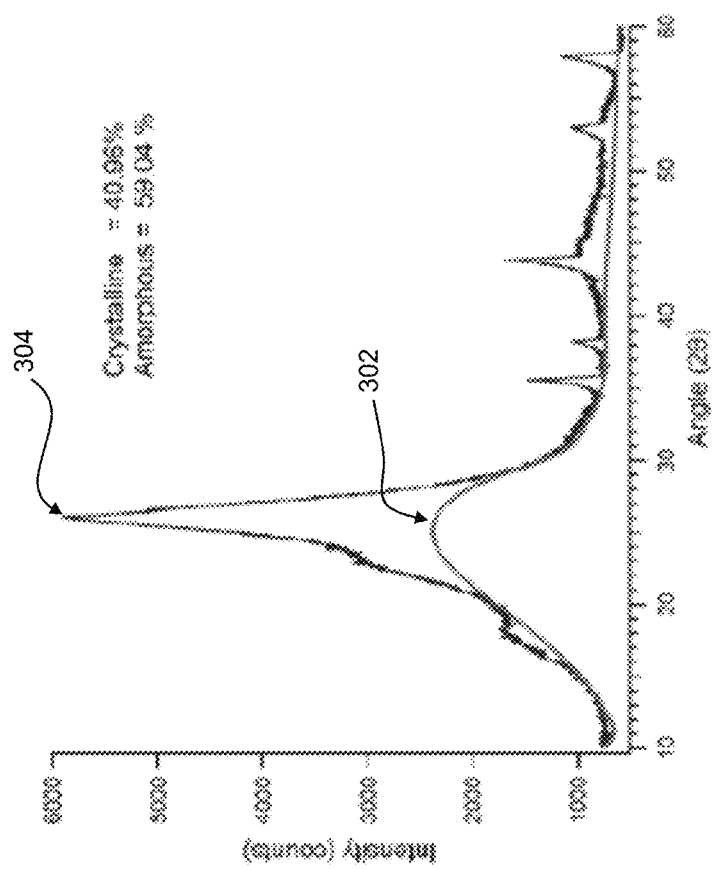
FIG. 3A is a graphical representation of X-ray diffraction analysis of crystalline and amorphous composition of a mixture of particles of polyethylene terephthalate and corundum, the polyethylene terephthalate in a non-irradiated form.
Figure 3B:
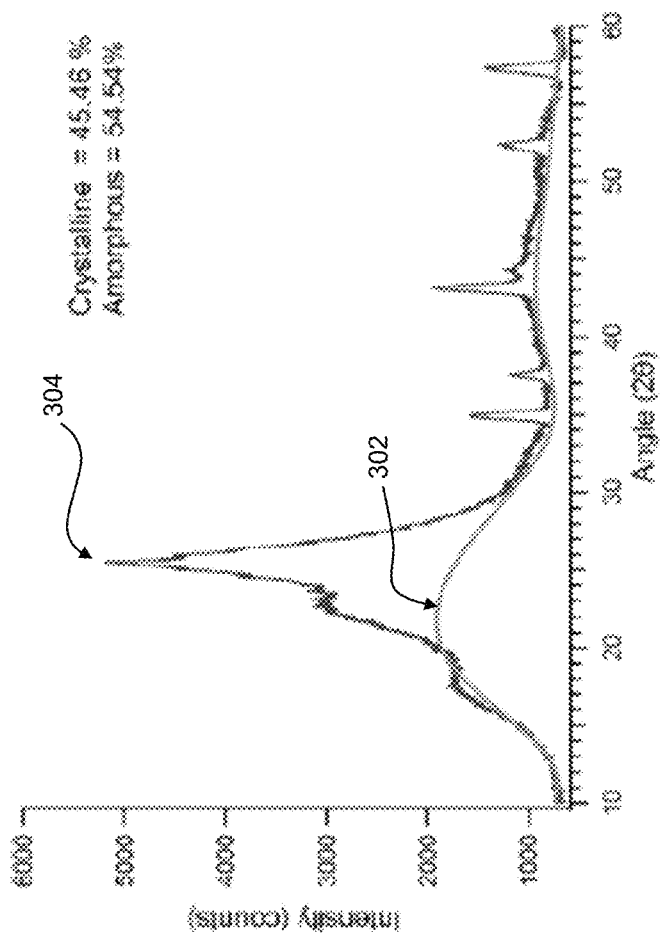
FIG. 3B is a graphical representation of X-ray diffraction analysis of crystalline and amorphous composition of a mixture of particles of polyethylene terephthalate and corundum, the polyethylene terephthalate irradiated with a low dose of gamma radiation.
Figure 3C:
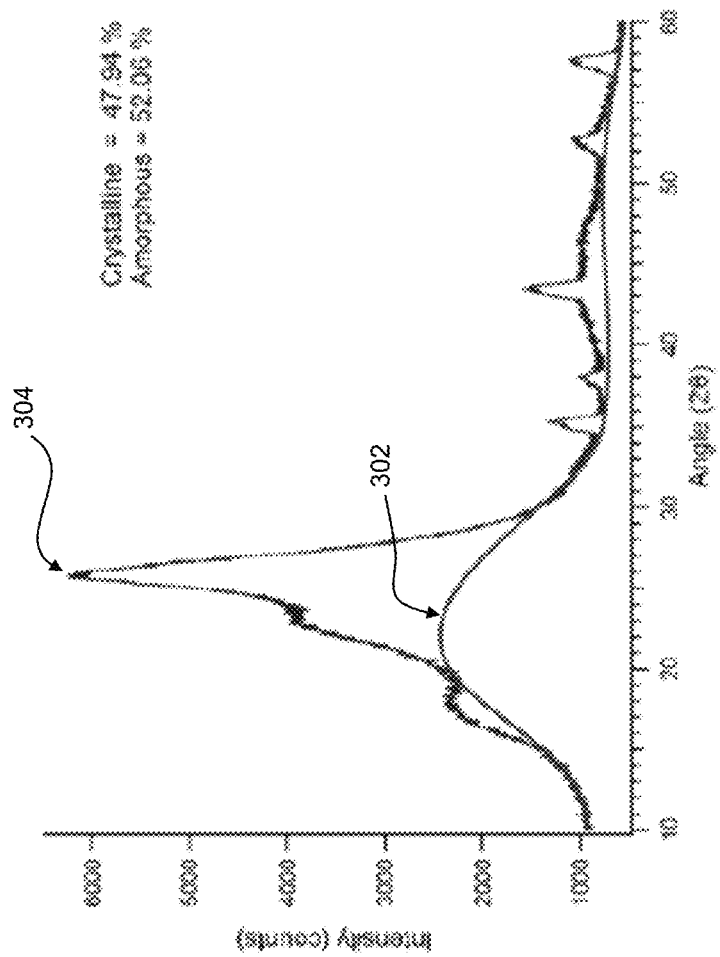
FIG. 3C is a graphical representation of X-ray diffraction analysis of crystalline and amorphous composition of a mixture of particles of polyethylene terephthalate and corundum, the polyethylene terephthalate irradiated with a high dose of gamma radiation.

Referring now to FIGS. 3A-3C, a crystalline portion and an amorphous portion was determined for the non-irradiated plastic (FIG. 3A), the low-dose plastic (FIG. 3B), and the high-dose plastic (FIG. 3C). More specifically, in each of FIGS. 3A-3C, the ratio of a first diffraction intensity trace 302 to a second diffraction intensity trace 304 provides an approximation of the weight fraction of the amorphous content, which is multiplied by 100 for representation as a respective percentage. The remaining percentage provides an approximation of the respective percentage by weight of the crystalline content. As may be observed through a comparison of FIGS. 3A-3C, the crystallinity appears to increase with radiation dose, with the high-dose plastic (FIG. 3C) demonstrating about 48% crystallinity. This increased crystallinity may be useful for improving the strength of specimens including irradiated plastic. Further details of the use of XRD to determine crystallinity are described in Varlashkin, P., "Approaches to quantification of amorphous content in crystalline drug substance by powder X-ray diffraction," Am. Pharmaceut. Rev. 14 (2011), the entire contents of which are hereby incorporated herein by reference.

1.4 Preparation of Cement Paste Samples

Cement paste samples were constructed using a process in which the components were mixed with a kitchen mixer and poured into 2 in. by 4 in. cylindrical molds, a standard for compressive strength testing. A constant water to cement ratio of 0.35 was used for preparing all of the samples, and the mixing procedure was performed per ASTM C305-14, "Standard Practice for Mechanical Mixing of Hydraulic Cement Pastes and Mortars of Plastic Consistency," ASTM International, West Conshohocken, Pa. 2014, to form the cement paste specimens.

1.5 Methods 1.5.1 Compression Test

The cement paste specimens were subjected to a compression test according to ASTM C39, "Standard Test Method for Compressive Strength of Cylindrical Concrete Specimens," (2016), the entire contents of which are hereby incorporated herein by reference. A 0.20 MPa/s loading rate was selected and kept consistent throughout the testing procedure. The percentage error for the loads within the proposed range of use of the testing machine did not exceed 1.0% of the indicated load. This procedure was performed for each of the three samples of the twelve cement-plastic combinations.

1.5.2 X-Ray Diffraction (XRD) of Cement Paste Specimens

The cement paste specimens, fractured from the compression testing, were crushed into a powder so that XRD could be performed for the purpose of identifying and quantifying crystalline phases that may contributed to the observed variation in strength, presented in the experimental results below. The highest strength sample of each set of three replications was used for this portion of the study (and for all remaining portions). XRD was conducted with an X-ray diffractometer that uses a Cu K-alpha radiation nickel foil filter. The ground sample was placed on Bragg-Brentano geometry optics on a flat plate sample geometry. A fixed divergence slit of $\frac{1}{16}°$ was chosen to limit beam overflow on the samples at small angles of 2 h. Incident and diffracted-side soller slits of 0.02 rad were used for this experiment. An X'Celerator high-speed linear detector (Malvern Panalytical, of Westborough, Mass., United States) was used with an active length of 2.122° 2 h, a step size of 0.0167113° 2 h, and a scan range from 4° to 90°. The High Score Plus software was used to carry out semi-qualitative studies via phase recognition analysis.

1.5.3 Back Scattered Electron (BSE) and Energy Dispersive Spectroscopy (EDS) Analysis.

Back Scattered Electron (BSE) imaging was performed on polished samples to examine the effect of the additives on the structure and chemistry of the cementitious matrix. For polishing, small fragments from the cement paste samples were epoxy impregnated and polished to 50 nm surface roughness. In BSE, beam electrons are reflected from the sample via elastic scattering. The images created can provide essential information about the distribution of various elements within the sample. A field-emission scanning electron microscope (FE-SEM) by ZEISS was used to carry out the BSE analysis. EDS elemental- and phase-mapping were also carried out on these samples. EDS is a technique used for the chemical characterization that derives its analytical capabilities from measurement of the photon energy emitted from the specimen. Because each element has unique atomic structure, and therefore a unique electromagnetic emission spectrum, it is possible to characterize individual elements and phases through EDS. Elemental- and phase-maps for each of the twelve polished samples were acquired using this technique.

1.5.4. X-Ray Microtomography (X-Ray μCT)

Fragments of the hardened cement paste samples were prepared as approximately 1 mm length cubes and examined using X-ray microtomography at Beamline 2-BM at the Advanced Photo Source, Argonne National Laboratory. X-ray microtomography allows for a full three-dimensional visualization of the samples by combining a series of two-dimensional images. Measurements were carried out with a parallel beam configuration using a hard X-ray synchrotron radiation of 25 keV. The samples were mounted between polymeric cones to permit alignment, and all the samples were within the field of view in the horizontal plane of the detector. X-ray detection was obtained with a scintillator and a charge couple device (CCD) camera with a resolution of 1920×1200 pixels and a voxel resolution of 5.86 μm. The CCD camera was coupled to two different ZEISS lenses (×2.5 and ×5 magnification), resulting in scans of 2.09 μm and 1.08 μm of pixel size, and it consistent of 4501 projections obtained through 180° rotation, with a variable exposure time of 0.2-0.4 s, depending on the size of the sample.

X-ray microtomography can extract the three-dimensional morphology of the pore network, which allows for the determination of segmented and effective porosity for the samples. Segmented porosity is associated with the extracted pore space, without any consideration of connectivity, whereas effective porosity is the sum of the total interconnected pore space. Image analysis and segmentation using IMAGEJ 1.48 software (National Institute of Health).

2. Results 2.1 Compression Test Analysis

Figure 4:
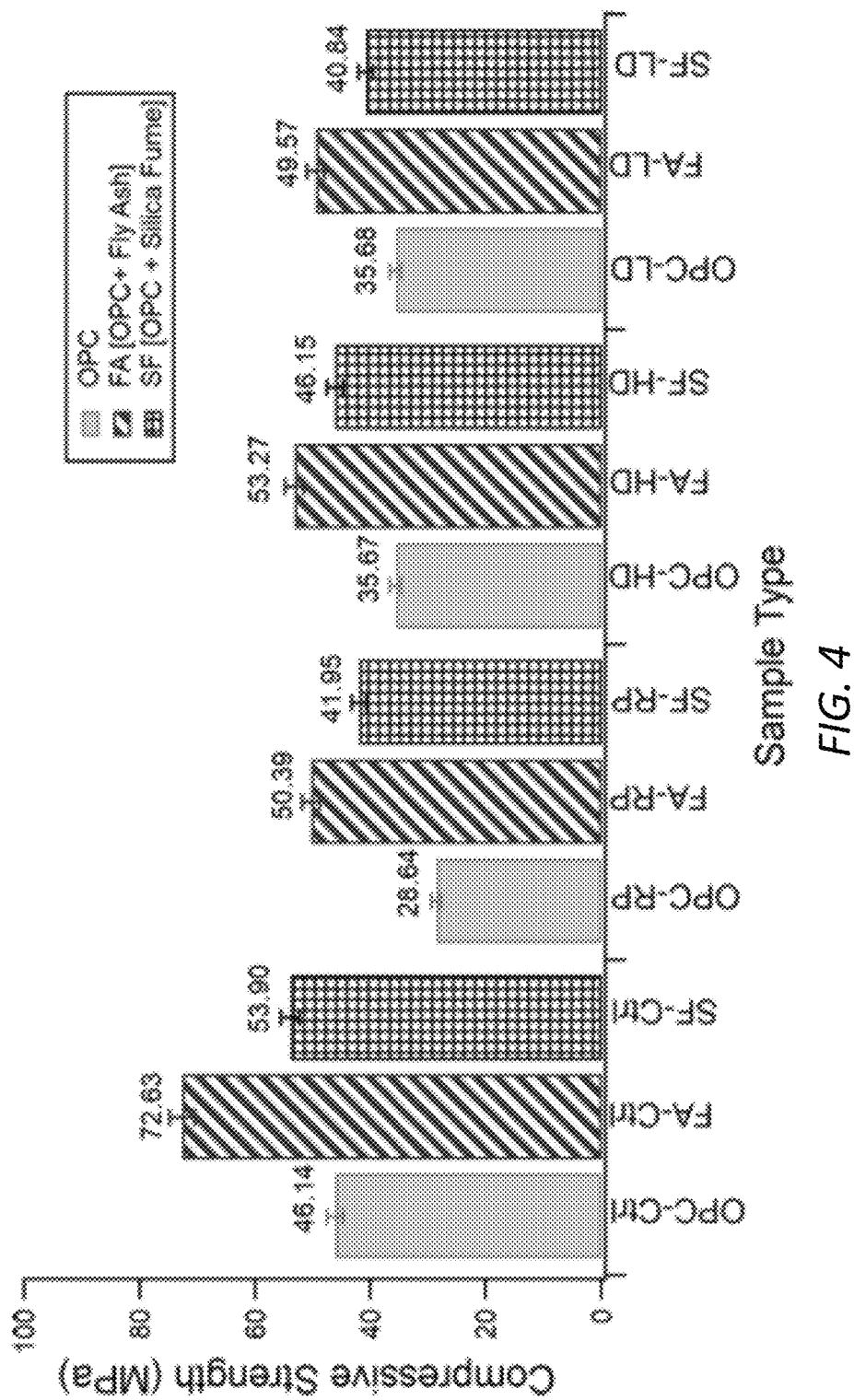
FIG. 4 is a graphical representation of compressive strength measurements of samples of cement paste, the samples of cement paste including control samples as well as samples of cement paste formed building materials according to the exemplary method of FIG. 2.

Referring now to FIG. 4, the results of the compression testing of the various test samples may be compared to one another to assess the impact of various different components on the compression strength of cement paste. The first three bars on the left of the graph shown in FIG. 4 represent the controls (cement paste formed from ordinary Portland cement (OPC-ctrl), cement paste formed from ordinary Portland cement with Fly Ash (FA-Ctrl), and cement paste formed from ordinary Portland cement with silica fume (SF-Ctrl)). Based on a comparison of these controls, it should be appreciated that the inclusion of fly ash and silica fume alone (without the addition of the plastic) contributed to increases in compression strength of 36% and 14%, respectively, as compared to the OPC-ctrl. The three bars to the right of the controls in FIG. 4 represent the samples including the regular (also referred to herein as non-irradiated) plastic in combination with the respective controls (ordinary Portland cement with regular plastic (OPC-RP), ordinary Portland cement with fly ash and regular plastic (FA-RP), and ordinary Portland cement with silica fume and regular plastic (SF-RP)). Based on a comparison of this latter triad with the former triad, it should be appreciated that the addition of regular plastic resulted in compression strengths significantly lower than those of the corresponding plastic-free control.

The three bars represent cement paste samples formed from build material including high-dose irradiated plastic (cement paste formed from ordinary Portland cement and high dose irradiated plastic (OPC-HD), cement paste formed from ordinary Portland cement and fly ash and high dose irradiated plastic (FA-HD), and cement paste formed from ordinary Portland cement and silica fume and high dose irradiated plastic (SF-HD)). The OPC-HD, FA-HD, and HD cement paste samples demonstrate a significant and surprising result. To understand this result, it may first be helpful to compare the compression strength of OPC-HD to the compression strength of OPC-ctrl, which indicates that the addition of high dose irradiated plastic, without the addition of any additives, decreases the compression strength (46.14 MPa reduces to 35.67 MPa). Continuing with this analysis, however, a comparison of the compression strength of FA-HD and SF-HD to the compression strength of OPC-ctrl and OPC-RP indicates that high dose irradiated plastic and an additive containing silicon dioxide may be combined with OPC to produce at least the same compression strength as the OPC-ctrl. Certain combinations (e.g., FA-HD) may, in fact, produce cement paste having compression strength greater than the compression strength of OPC-ctrl, thus suggesting the usefulness of certain combinations for the fortification of cement paste. Stated differently, while irradiated plastic may generally decrease compression strength of cement paste, fly ash or silica fume may advantageously interact with irradiated plastic and cement to offset this decrease. Thus, as a global observation, certain combinations of cement, irradiated plastic and at least one additive including silicon dioxide demonstrate the surprising result of a plastic-containing cement paste having the same, or even improved, compressive strength as compared cement paste formed from cement by itself.

The three bars represent cement paste samples formed from build material including low-dose irradiated plastic (cement paste formed from ordinary Portland cement and low-dose irradiated plastic (OPC-LD), cement paste formed from ordinary Portland cement and fly ash and low-dose irradiated plastic (FA-LD), and cement paste formed from ordinary Portland cement and silica fume and low-dose irradiated plastic (SF-LD)). The OPC-LD, FA-LD, and SF-LD cement paste samples demonstrate the impact of radiation dosage on beneficial interactions between the irradiated plastic and fly ash or silica fume. For example, based on a comparison of FA-LD and FA-HD, it may be observed that the use of higher doses of radiation of the plastic may increase compression strength. A similar increase may be observed with respect to a comparison of SF-LD and SF-HD. Thus, in general, it may be appreciated that, in combination with a given type of additive, radiation dosage of the plastic may be controlled to achieve target compression strength of a plastic-containing cement paste.

The test results presented in the discussion that follows present certain aspects of interaction of components that may be useful in understanding the underlying mechanisms associate with the unexpected compression strength achievable in cement paste formed in build materials including cement paste including calcium oxide, a polymer having a semi-crystalline structure, and at least one additive including silicon dioxide.

2.2 X-Ray Diffraction Analysis

Figure 5A:
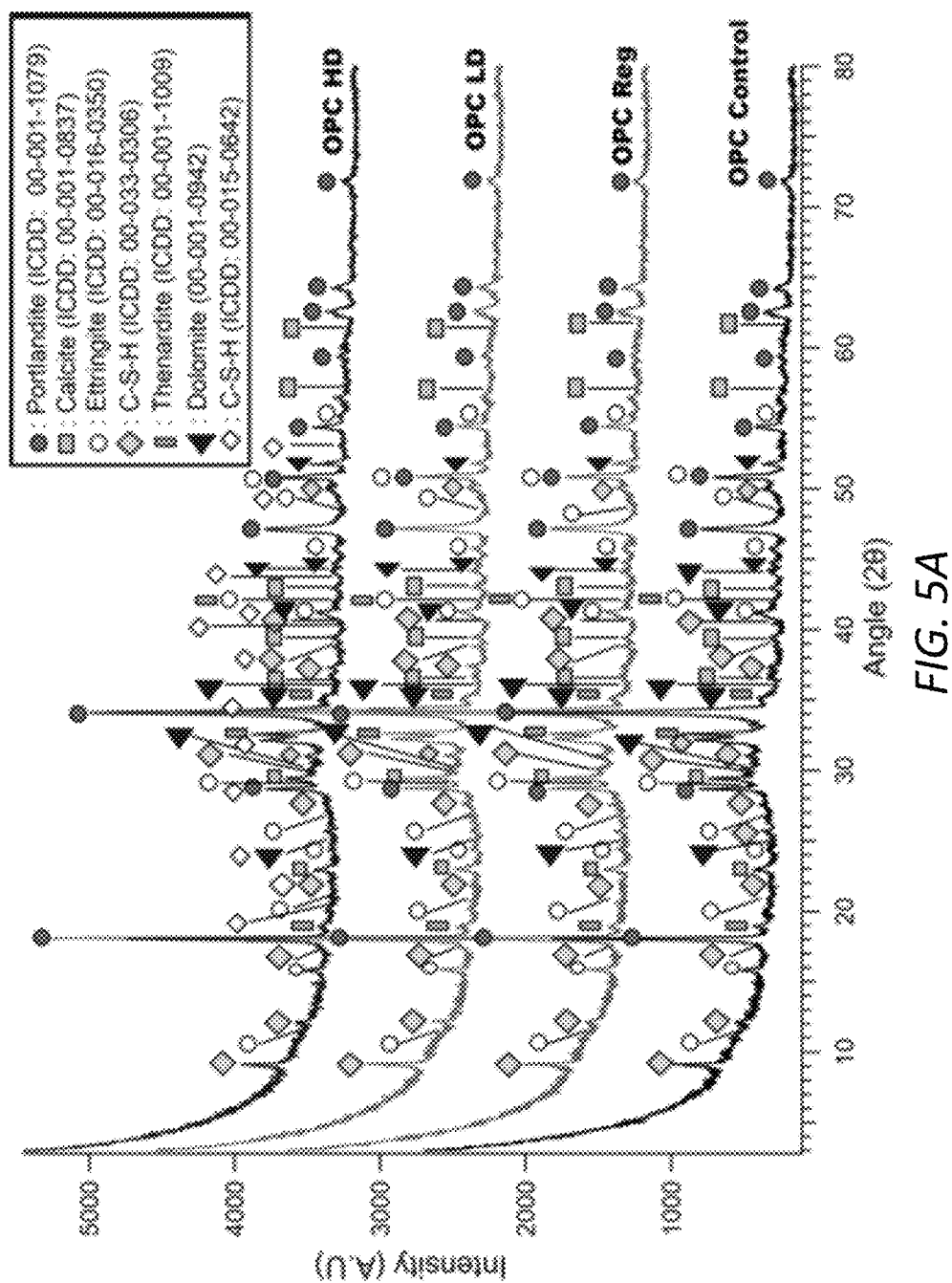
FIG. 5A is a graphical representation of X-ray diffraction spectra of certain samples of cement paste graphically represented in FIG. 4, the samples of cement paste including a control sample of formed from cement by itself, a sample including cement paste formed from cement and non-irradiated plastic, a sample including cement paste formed from cement and low-dose irradiated plastic, and a sample including cement paste formed from cement and a high-dose irradiated plastic.
Figure 5B:
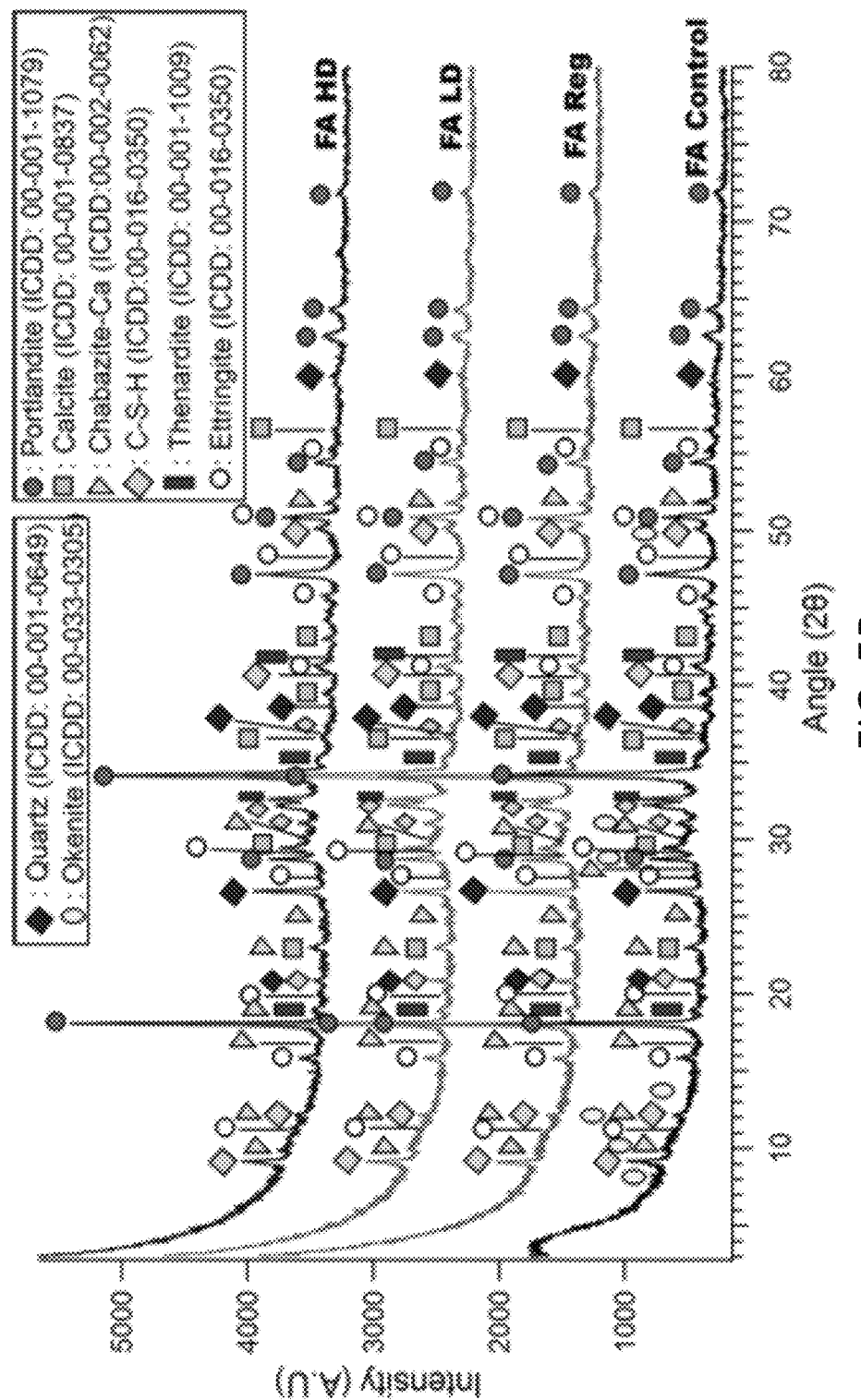
FIG. 5B is a graphical representation of X-ray diffraction spectra of certain samples of cement paste graphically represented in FIG. 4, the samples of cement paste including a control of cement paste formed from cement and fly ash without plastic, a sample including cement paste formed from cement, fly ash, and non-irradiated plastic, a sample including cement paste formed from cement, fly ash, and a low-dose irradiated plastic, and a sample including cement paste formed from cement, fly ash, and a high-dose irradiated plastic.
Figure 5C:
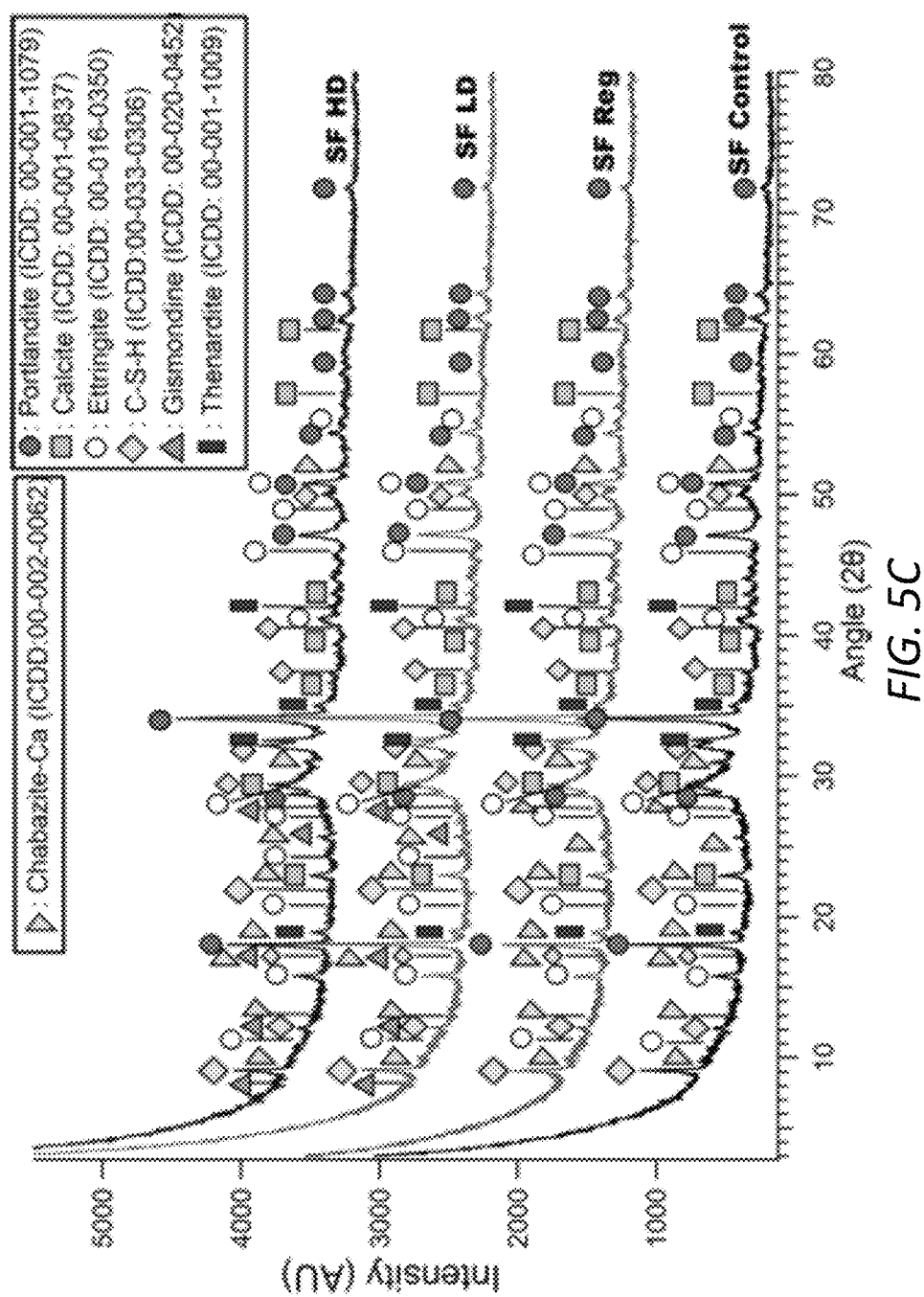
FIG. 5C is a graphical representation of X-ray diffraction spectra of certain samples of cement paste graphically represented in FIG. 4, the samples of cement paste including a control of cement paste formed from cement and silica fume without plastic, a sample including cement paste formed from cement, silica fume, and non-irradiated plastic, a sample including cement paste formed from cement, silica fume, and a low-dose irradiated plastic, and a sample including cement paste formed from cement silica fume, and a high-dose irradiated plastic.
Figure 6A:
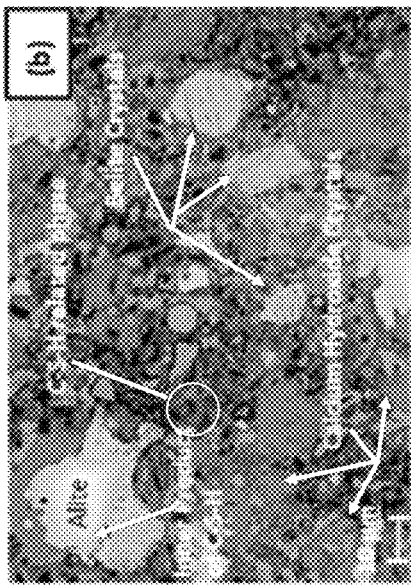
FIG. 6A is a backscattered electron image of a hardened, polished sample of cement paste formed from ordinary Portland cement and fly ash, with the sample corresponding to a sample graphically represented in FIG. 4.
Figure 6B:
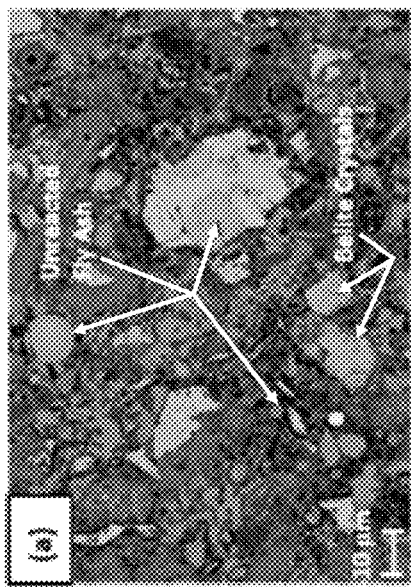
FIG. 6B is a backscattered electron image of a hardened, polished sample of cement paste formed from ordinary Portland cement, fly ash, and regular plastic, with the sample corresponding to a sample graphically represented in FIG. 4.
Figure 6C:
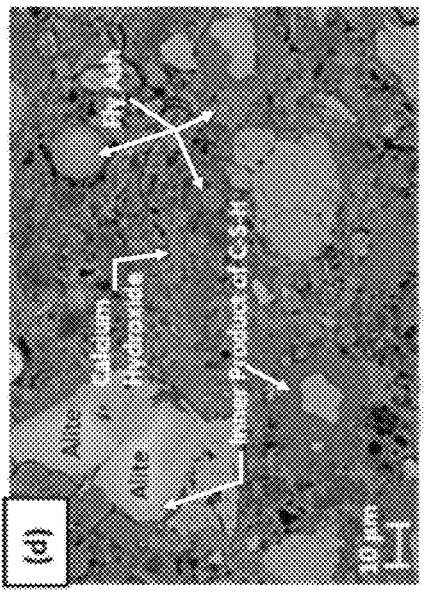
FIG. 6C is a backscattered electron image of a hardened, polished sample of cement paste formed from ordinary Portland cement, fly ash, and low-dose irradiated plastic, with the sample corresponding to a sample graphically represented in FIG. 4.
Figure 6D:
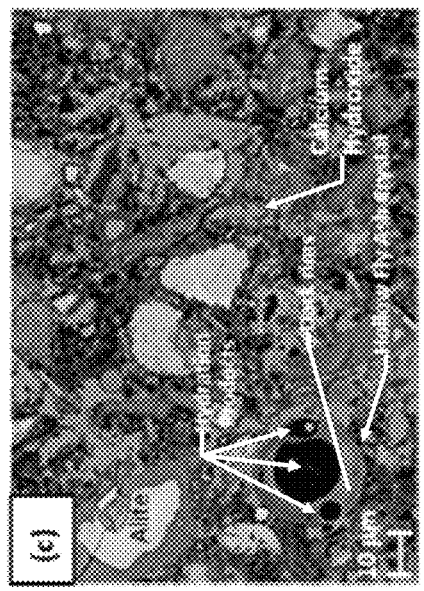
FIG. 6D is a backscattered electron image of a hardened, polished sample of cement paste formed from ordinary Portland cement, fly ash, and high-dose irradiated plastic, with the sample corresponding to a sample graphically represented in FIG. 4.

Referring now to FIGS. 5A-5C, X-ray diffraction (XRD) spectra were obtained for all of the cement paste samples. The XRD spectra for the four cement paste samples formed from ordinary Portland cement without fly ash or silica fume are shown in FIG. 5A (represented as OPC control, OPC Reg, OPC LD, and OPC HD. Ctrl, RP, LD, and HD). The XRD spectra for the four cement paste samples formed from ordinary Portland cement and fly ash are shown in FIG. 5B (represented as FA control, FA Reg, FA LD, and FA HD). The XRD spectra for the four cement paste samples formed from ordinary Portland cement and silica fume are shown in FIG. 5C (represented as SF control, SF Reg, SF LD, and SF HD).

Referring now to FIG. 5A, hydrated OPC calcium silicate hydrate (C—S—H) phases were detected on all samples shown in this figure. In addition, Portlandite, a crystalline form of calcium hydroxide, along with calcite was observed among the samples. The sulfate related phases that are were present were thenardite and ettringite. In addition, dolomites were detected among the samples shown in FIG. 5A. Addition of high dose plastic led to the formation of different forms of C—S—H phases ($Ca_{1.5}SiO_{3.5}H_2O$|ICDD: 00-033-0306; $Ca_2SiO_4.0.5H_2O$ ICDD: 00-15-0642) indicating that irradiation of plastic at high dose can alter crystal structure and chemical composition of C—S—H gels.

Referring now to FIG. 5B, many of the same phases were observed in the cement paste samples in this figure as in the cement paste samples shown in FIG. 5A, given that the main precursor forming the samples in each case was ordinary Portland cement. The okenite phase, which is related to a zeolite type mineral, was only present in the FA-Control sample, and it is unclear whether the presence of okenite led to any alkali silica reaction (ASR_gel formation. The addition of irradiated plastic allowed for different forms of C-A-S—H gel formation (chabazite-Ca were present), though in this case those phases were detected in FA control and FA-RP samples as well.

Referring now to FIG. 5C, again many of the same phases were observed in the cement paste samples in this figure as in the cement paste samples shown in FIGS. 5A and 5B. The presence of gismondine was detected only in the SF LD sample and the SF-HD sample. Thus, without wishing to be bound by theory, irradiated plastic along with the addition of silica fume may have contributed to unique C-A-S—H gel formation. The gismondine phase, specifically, may be attributed to the storage of chemically bound water incorporating ions of calcium and silicon in small cages, which may later contribute to additional hydration and an increase in strength of the cement matrix along with the C—S—H gels. Again without wishing to be bound by theory, this effect may at least partially explain the strength increase observed for the SF-HD sample as compared to the SF-RP sample (FIG. 4).

Referring now to FIGS. SA-SC collectively, in addition to differences within each binder type due to the various plastic additives, there were also distinct dissimilarities apparent in the comparison of OPC samples (FIG. 5A), the FA samples (FIG. 5B), and the SF samples (FIG. 5C). C—S—H type III was present only among the OPC samples (FIG. 5A), whereas okenite was observed only in the FA samples (FIG. 5B). Without wishing to be bound by theory, the presence of okenite in these samples may have contributed to the observed strength increases (FIG. 4) resulting from the addition of fly ash.

2.3 Backscattered Electron (BSE) and Ternary Phase Diagram Analysis

Referring now to FIGS. 6A-6D, BSE images of cement samples formed from build materials including fly ash may provide insight into individual hydration products. During the cement hydration process, the free water may react with the clinker, forming chemically bound water, which is formed in C—S—H gels. It can be seen that there is a water-filled outer space of C—S—H and calcium hydroxide crystals, along with alite ($C_3S$). A central grain of belite ($C_2S$) that is ~4 microns in size is also observable. Further, the Portland cement powder contains pure $C_3S$ (tricalcium silicate, also known as alite), $C_2S$ (dicalcium silicate, also known as belite), $C_3A$ (tricalcium aluminate), and $C_4AF$ (tetracalcium aluminoferrite), but hydration forms these into impure forms. Thus, the alites and belites, which are products formed during hydration, are imputer forms of these compounds.

Inclusion of fly ash let to spherical, unreacted fly ash particulates that may not have been involved in the hydration process. As shown in FIG. 8C, fly ash grains appear to be hollow, and it is possible that hydrates have filled inside the grains. Dark rims of magnesium containing hydrotalcite-like phases were also observed in these samples. The darker grey areas in the BSE image are made up of enriched carbon and oxygen and are attributed to carbonates.

While certain qualitative insights are to be gained from the images in FIGS. 6A-D, a more definitive comparison of specimens may be made visually with a ternary diagram, as described below.

Figure 7:
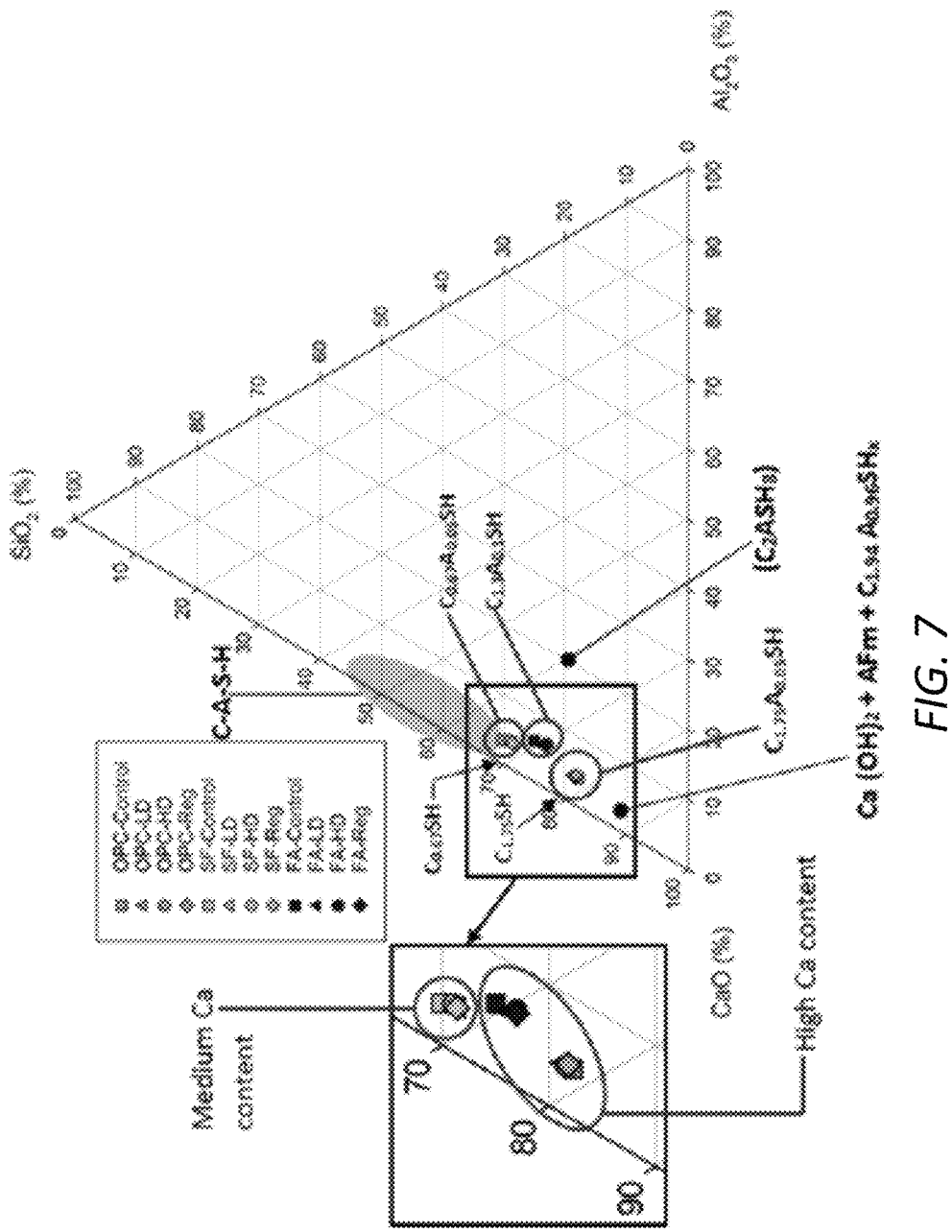
FIG. 7 is a ternary diagram of $CaO$—$Al_2O_3$—$SiO_2$ showing bulk composition obtained via Energy Dispersive Spectroscopy (EDS) analysis of the cement paste samples graphically represented in FIG. 4, with the ternary diagram including CaO plotted on the left-side axis, $Al_2O_3$ plotted on the bottom axis, and $SiO_2$ plotted on the right-side axis.

Referring now to FIG. 7, the cement paste samples were analyzed using energy dispersive spectroscopy (EDS) to obtain bulk composition, and the respective bulk compositions of the cement paste samples are shown on the CaO—$AlO_3$—$SiO_2$ ternary diagram. From the ternary phase diagram, it may be understood that the addition of mineral additives (e.g., silica fume or fly ash) led to an increase in $SiO_2$ and a decrease in CaO. The cement paste samples formed from ordinary Portland cement (without the addition of mineral additives), therefore, can be classified as having high calcium content, whereas the cement paste samples formed from build materials including mineral additives have medium calcium content. The results shown in FIG. 7 indicate that the addition of silica fume increases silica content, thus increasing the formation of silicate in C-A-S—H gels, whereas the addition of fly ash formed C-A-S—H gel with higher alumina content. Without wishing to be bound by theory, this suggests that the alumina content, in addition to the secondary C—S—H formed to the addition of fly ash in Portland cement in some of the build materials used to form the cement paste samples, helped to form the high-density phases that contributed to the higher relative strength among the cement paste samples formed from build materials including fly ash.

2.4 X-Ray Microtomography (X-Ray μCT) Analysis

Figure 8:
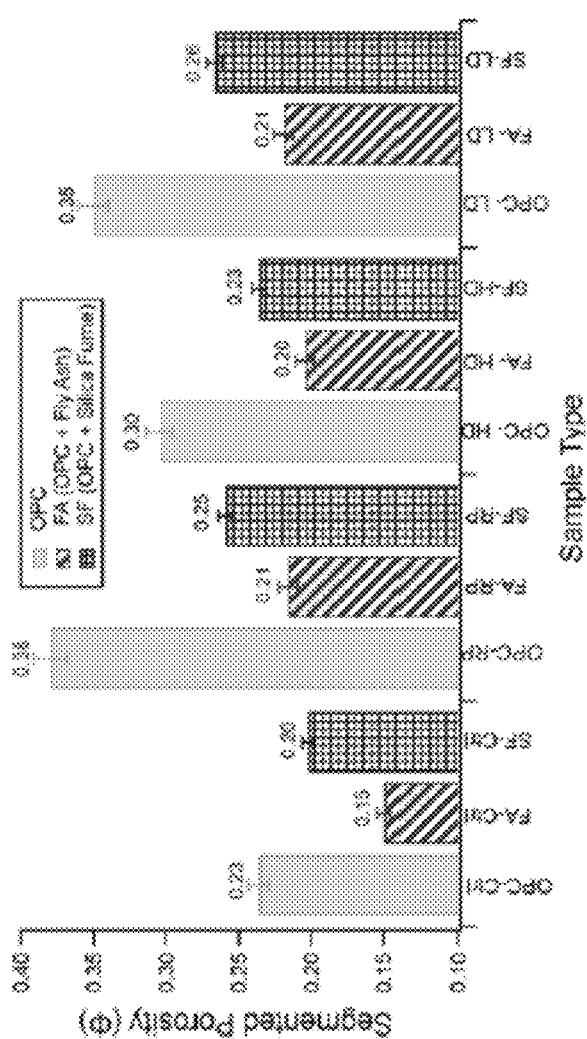
FIG. 8 is a graphical representation of segmented porosities obtained from X-ray microtomography data for samples of cement paste, the samples of cement paste corresponding to the samples graphically represented in FIG. 4.

Referring now to FIG. 8, segmented porosities were obtained via a segmentation process using X-ray microtomography applied to each of the samples of cement paste used in these experiments. The cement paste sample formed from ordinary Portland cement and regular plastic (OPC-RP) exhibited the highest porosity (0.38), whereas the cement paste sample formed from ordinary Portland cement and fly ash (without plastic) exhibited the least porosity (0.15). Without wishing to be bound by theory, the results suggest that the addition of fly ash and silica fume led to decreases in porosity as compared to the porosity observed in samples formed from ordinary Portland cement without these mineral additives. The addition of high-dose irradiated plastic contributed to a decrease in segmented porosity for cement paste formed for all three binder types (ordinary Portland cement and high-dose irradiated plastic (OPC-HD), ordinary Portland cement and fly ash and high-dose irradiated plastic (FA-HD), and ordinary Portland cement and silica fume and high-dose irradiated plastic (SF-HD)) when compared to samples formed from cement paste in which regular plastic is used in the build material (OPC-RP, FA-RP, and SF-RP). Without wishing to be bound by theory, this reduction in porosity may be attributed to variation in the crystal structure and phases which significantly affected the pore structure formation. For example, cement paste formed from ordinary Portland cement and low-dose irradiated plastic (OPC-LD) had only one type of C—S—H phase, while cement paste formed from ordinary Portland cement and high-dose irradiated plastic (OPC-HD) led to two different types of C—S—H gels. The formation of additional gels may have contributed to additional densification of the resulting cementitious matrix. This suggests that inclusion of irradiated plastic may have acted as a pore-blocking agent, in addition to its formation of chemical phases such as C—S—H and C-A-S—H, which contributed to the densification of the cementitious matrix.

In general, as these experimental results indicate, the use gamma irradiated plastic (e.g., from a recycled source) in place of plastic in a non-irradiated form may be useful for partially recovering strength of cement paste formed from Portland cement, while advantageously displacing a volume of the Portland cement to reduce carbon footprint. Further, through the incorporation of supplementary cementitious material (SCM), such as one or more of fly ash or silica fume, in combination with irradiated plastic, compressive strength of cement paste may be preserved, or even improved, as the volume of cement is displaced by the high-dose irradiated plastic. Accordingly, these experimental results should be understood to demonstrate that irradiated plastic and one or more mineral additives may be used in combination with cement to form cement paste with a reduced carbon footprint without compromising compression strength of the resulting cement paste.

While certain implementations have been described, other implementations are additionally or alternatively possible.

As an example, while the build material has been described herein as being formed through instructions carried out by one or more processors of a controller, it should be appreciated that other formation approaches may further or instead be used to form the build material. For example, unless otherwise indicated or made clear from the context, it should be appreciated that any one or more of various steps for forming the build material may be carried out manually. As a specific example, components of the build material may be manually mixed together to form cement paste. Such manual mixing may be particularly useful, for example, for small batches of cement paste, as may be appropriate for certain residential construction applications.

As an example, while the build material has been described herein as being formed through batch processing, it should be appreciated that the build material may be additionally or alternatively formed through continuous or semi-continuous processing. The degree of processing continuity may be, for example, related to the scale of production, with industrial scale production generally including increased automation as compared to small scale production.

As a further example, while the build material has been described as being used to form cement paste, it should be appreciated that the build material may be additionally or alternatively used to form mortar, grout, or any other material that may be formed from cement.

As yet another example, while the build material has been described as including a polymer, cement, and at least one additive including silicon dioxide. It should be appreciated that the build material may include additional or alternative materials, such as may be useful for achieving a material that is an environmentally advantageous alternative to conventional cement paste while having at least the same compression strength as cement paste formed from cement by itself. Thus, in some implementations, the build material may further or instead include corundum in a ratio with the particles of the polymer in a predetermined mass ratio greater than about 8:1 and less than about 10:1 (e.g., about 9:1).

As still another example, while the build material has been described as having a beneficial environmental impact through the replacement of a portion of cement with a recycled polymer, it should be appreciated that inclusion of the polymer in the build material may have additional or alternative environmental benefits. For example, the polymer may have a significantly lower thermal conductivity as compared to cement paste formed from cement alone. Accordingly, inclusion of the polymer in the build material may be useful to form cement paste having improved thermal insulation performance relative to cement paste formed from cement alone. In certain applications, such improved thermal insulation performance may reduce greenhouse gas emissions by reducing energy required for heating and/or cooling.

As yet another example, while the polymer has been described as including polyethylene terephthalate (PET), it should be appreciated that additional or alternative polymers with semi-crystalline structures may be used in the formation of build materials described herein. Examples of additional or alternative polymers may include, but are not limited to, nylon, polyethylene, or polypropylene, each of which may be abundant in recycled waste streams and may be amenable to optical sorting or other automated forms of identification.

As another example, additional or alternative examples are described in Schaefer, C. E., Kupwade-Patil K., Ortega M., Soriano, C., Büyüköztürk, O., White, A. E., and Short, M. P., "Irradiated recycled plastic as a concrete additive for improved chemo-mechanical properties and lower carbon footprint," Waste Manag. 2018 January; 71:426-439, the entire contents of which are hereby incorporated herein.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method of forming a building material, the method comprising:
   receiving particles of a polymer in a non-irradiated form, the polymer having a semi-crystalline structure;
   irradiating the particles of the polymer from the non-irradiated form to an irradiated form with a dose of gamma radiation increasing crystallinity and crosslinking of the polymer from the non-irradiated form to the irradiated form; and
   combining the particles of the polymer in the irradiated form with at least a cement, and at least one additive to form a mixture, the cement including calcium oxide, and the at least one additive including silicon dioxide.

2. The method of claim 1, wherein the dose of gamma radiation is greater than about 100 kGy and less than about 150 kGy.

3. The method of claim 1, wherein irradiating the particles of the polymer includes introducing the dose of the gamma radiation to the particles of the polymer at a rate of 58 Gy/min.

4. The method of claim 1, wherein the at least one additive further includes alumina.

5. The method of claim 1, wherein the at least one additive includes silica fume, fly ash, or a combination thereof.

6. The method of claim 1, wherein the cement is ordinary Portland cement.

7. The method of claim 1, wherein the polymer is polyethylene terephthalate.

8. The method of claim 1, wherein the particles of the polymer are greater than about 1 percent of a total mass of the mixture in an anhydrous form and less than about 2 percent of the total mass of the mixture in the anhydrous form.

9. The method of claim 1, wherein receiving the particles of the polymer includes receiving a stock material and mechanically separating the particles of the polymer from other components in a stream of stock material.

10. The method of claim 1, wherein receiving the particles of the polymer includes mechanically reducing an average particle size of the particles of the polymer.

11. The method of claim 1, further comprising hydrating the mixture to form a cement paste.

12. The method of claim 11, wherein hydrating the mixture to form the cement paste includes adding water to the mixture in a predetermined volumetric ratio with the cement.

13. The method of claim 11, further comprising maintaining substantially constant moisture content in the cement paste during a curing period following formation of the cement paste.

14. The method of claim 11, further comprising exposing the cement paste to a polar solvent following a predetermined curing period.

15. A building material comprising:
   a cement including calcium oxide;
   at least one additive including silicon dioxide; and
   particles of a polymer, the particles of the polymer in a non-irradiated form having a semi-crystalline structure, the particles of the polymer configured for irradiation from the non-irradiated form to an irradiated form with a dose of gamma radiation, the particles of the polymer in the irradiated form having crystallinity and crosslinking greater than respective crystallinity and crosslinking of the polymer in the non-irradiated form, wherein the at least one additive and the particles of the polymer in the irradiated form are dispersed in the cement in a mixture, wherein the crystallinity of the irradiated form of the polymer is at least about 15 percent greater than the crystallinity of the polymer in the non-irradiated form.

16. The build material of claim 15, wherein the cement is ordinary Portland cement.

17. The build material of claim 15, wherein the at least one additive further includes alumina.

18. The build material of claim 15, wherein the at least one additive includes silica fume, fly ash, or a combination thereof.

* * * * *